(12) United States Patent
Ellard et al.

(10) Patent No.: US 8,356,009 B2
(45) Date of Patent: Jan. 15, 2013

(54) IMPLEMENTATION DEFINED SEGMENTS FOR RELATIONAL DATABASE SYSTEMS

(75) Inventors: Scott Ellard, Marietta, GA (US); Erik Jones, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 11/900,769

(22) Filed: Sep. 13, 2007

(65) Prior Publication Data

US 2008/0069132 A1  Mar. 20, 2008

Related U.S. Application Data

(60) Provisional application No. 60/845,073, filed on Sep. 15, 2006.

(51) Int. Cl.
*G06F 7/00* (2006.01)
*G06F 17/00* (2006.01)
*G06F 17/30* (2006.01)

(52) U.S. Cl. ........ 707/620; 707/808; 707/959; 707/964; 707/967

(58) Field of Classification Search ................ 707/100, 707/610, 620, 621, 622, 808
See application file for complete search history.

(56) References Cited

U.S. PATENT DOCUMENTS

| | | | |
|---|---|---|---|
| 4,531,186 A | 7/1985 | Knapman | |
| 5,020,019 A | 5/1991 | Ogawa | |
| 5,134,564 A | 7/1992 | Dunn et al. | |
| 5,247,437 A | 9/1993 | Vale et al. | |
| 5,321,833 A | 6/1994 | Chang et al. | |
| 5,323,311 A | 6/1994 | Fukao et al. | |
| 5,333,317 A | 7/1994 | Dann | |
| 5,381,332 A * | 1/1995 | Wood | ........................... 705/7.25 |
| 5,442,782 A | 8/1995 | Malatesta et al. | |

(Continued)

FOREIGN PATENT DOCUMENTS

WO    9855947 A1   12/1998

(Continued)

OTHER PUBLICATIONS

Fair, "Record Linkage in the National Dose Registry of Canada", European Journal of Cancer, 33:S37-S43, XP005058648 ISSN: 0959-8049, Apr. 1997.

(Continued)

*Primary Examiner* — Wilson Lee
*Assistant Examiner* — Mark Hershley
(74) *Attorney, Agent, or Firm* — Elissa Y. Wang SVL, IP Law; Edell, Shapiro & Finnan, LLC

(57) ABSTRACT

Embodiments disclosed herein provide an implementation defined segments (IDS) subsystem which allows new data segments to be added to an identity hub after deployment. A set of metadata tables are utilized to describe IDS, each of which is a data structure encapsulating a single row from a master data record residing in the identity hub. Once a segment (an object) is described, the identity hub can use the information to define persistent storage for the object in the database for any relational database management system, create internal structures to hold the data and process business rules and demographic comparisons against the data object, describe the data object to remote clients, and allow the clients to query the identity hub at runtime about what data objects exist, what fields and data types they contain, and additionally how they might be displayed or formatted on various clients.

24 Claims, 8 Drawing Sheets

U.S. PATENT DOCUMENTS

| | | | |
|---|---|---|---|
| 5,497,486 A | 3/1996 | Stolfo et al. | |
| 5,535,322 A | 7/1996 | Hecht | |
| 5,535,382 A | 7/1996 | Ogawa | |
| 5,537,590 A * | 7/1996 | Amado | 1/1 |
| 5,555,409 A | 9/1996 | Leenstra et al. | |
| 5,561,794 A | 10/1996 | Fortier | |
| 5,583,763 A | 12/1996 | Atcheson et al. | |
| 5,600,835 A | 2/1997 | Garland et al. | |
| 5,606,690 A | 2/1997 | Hunter et al. | |
| 5,615,367 A | 3/1997 | Bennett et al. | |
| 5,640,553 A | 6/1997 | Schultz | |
| 5,651,108 A | 7/1997 | Cain et al. | |
| 5,675,752 A | 10/1997 | Scott et al. | |
| 5,675,753 A | 10/1997 | Hansen et al. | |
| 5,694,593 A | 12/1997 | Baclawski | |
| 5,694,594 A | 12/1997 | Chang | |
| 5,710,916 A | 1/1998 | Barbara et al. | |
| 5,734,907 A | 3/1998 | Jarossay et al. | |
| 5,765,150 A | 6/1998 | Burrows | |
| 5,774,661 A | 6/1998 | Chatterjee | |
| 5,774,883 A | 6/1998 | Anderson | |
| 5,774,887 A | 6/1998 | Wolff et al. | |
| 5,778,370 A | 7/1998 | Emerson | |
| 5,787,431 A | 7/1998 | Shaughnessy | |
| 5,787,470 A | 7/1998 | DeSimone et al. | |
| 5,790,173 A | 8/1998 | Strauss | |
| 5,796,393 A | 8/1998 | MacNaughton et al. | |
| 5,805,702 A | 9/1998 | Curry | |
| 5,809,499 A | 9/1998 | Wong et al. | |
| 5,819,264 A | 10/1998 | Palmon et al. | |
| 5,835,712 A | 11/1998 | DuFresne | |
| 5,835,912 A | 11/1998 | Pet | |
| 5,848,271 A | 12/1998 | Caruso et al. | |
| 5,859,972 A | 1/1999 | Subramaniam et al. | |
| 5,862,322 A | 1/1999 | Anglin et al. | |
| 5,862,325 A | 1/1999 | Reed et al. | |
| 5,878,043 A * | 3/1999 | Casey | 370/397 |
| 5,893,074 A | 4/1999 | Hughes et al. | |
| 5,893,110 A | 4/1999 | Weber et al. | |
| 5,905,496 A | 5/1999 | Lau et al. | |
| 5,930,768 A | 7/1999 | Hooban | |
| 5,960,411 A | 9/1999 | Hartman et al. | |
| 5,963,915 A | 10/1999 | Kirsch | |
| 5,987,422 A | 11/1999 | Buzsaki | |
| 5,991,758 A | 11/1999 | Ellard | |
| 5,999,937 A | 12/1999 | Ellard | |
| 6,014,664 A | 1/2000 | Fagin et al. | |
| 6,016,489 A | 1/2000 | Cavanaugh et al. | |
| 6,018,733 A | 1/2000 | Kirsch et al. | |
| 6,018,742 A | 1/2000 | Herbert, III | |
| 6,026,433 A | 2/2000 | D'Arlach et al. | |
| 6,049,847 A | 4/2000 | Vogt et al. | |
| 6,067,549 A | 5/2000 | Smalley et al. | |
| 6,069,628 A | 5/2000 | Farry et al. | |
| 6,078,325 A | 6/2000 | Jolissaint et al. | |
| 6,108,004 A | 8/2000 | Medl | |
| 6,134,581 A | 10/2000 | Ismael et al. | |
| 6,185,608 B1 | 2/2001 | Hon et al. | |
| 6,223,145 B1 | 4/2001 | Hearst | |
| 6,269,373 B1 | 7/2001 | Apte et al. | |
| 6,297,824 B1 | 10/2001 | Hearst et al. | |
| 6,298,478 B1 | 10/2001 | Nally et al. | |
| 6,311,190 B1 | 10/2001 | Bayer et al. | |
| 6,327,611 B1 | 12/2001 | Everingham | |
| 6,330,569 B1 | 12/2001 | Baisley et al. | |
| 6,356,931 B2 | 3/2002 | Ismael et al. | |
| 6,374,241 B1 | 4/2002 | Lamburt et al. | |
| 6,385,600 B1 | 5/2002 | McGuinness et al. | |
| 6,389,429 B1 | 5/2002 | Kane et al. | |
| 6,446,188 B1 | 9/2002 | Henderson et al. | |
| 6,449,620 B1 | 9/2002 | Draper | |
| 6,457,065 B1 | 9/2002 | Rich et al. | |
| 6,460,045 B1 | 10/2002 | Aboulnaga et al. | |
| 6,496,793 B1 | 12/2002 | Veditz et al. | |
| 6,502,099 B1 | 12/2002 | Rampy et al. | |
| 6,510,505 B1 | 1/2003 | Burns et al. | |
| 6,523,019 B1 | 2/2003 | Borthwick | |
| 6,529,888 B1 | 3/2003 | Heckerman et al. | |
| 6,556,983 B1 | 4/2003 | Altschuler et al. | |
| 6,557,100 B1 | 4/2003 | Knutson | |
| 6,621,505 B1 | 9/2003 | Beauchamp et al. | |
| 6,633,878 B1 * | 10/2003 | Underwood | 1/1 |
| 6,633,882 B1 * | 10/2003 | Fayyad et al. | 1/1 |
| 6,633,992 B1 | 10/2003 | Fayyad et al. | |
| 6,647,383 B1 | 11/2003 | August et al. | |
| 6,662,180 B1 | 12/2003 | Aref et al. | |
| 6,687,702 B2 | 2/2004 | Vaitheeswaran et al. | |
| 6,704,805 B1 | 3/2004 | Acker et al. | |
| 6,718,535 B1 | 4/2004 | Underwood | |
| 6,742,003 B2 * | 5/2004 | Heckerman et al. | 398/189 |
| 6,757,708 B1 | 6/2004 | Craig et al. | |
| 6,795,793 B2 * | 9/2004 | Shayegan et al. | 702/179 |
| 6,807,537 B1 | 10/2004 | Thiesson et al. | |
| 6,842,761 B2 | 1/2005 | Diamond et al. | |
| 6,842,906 B1 | 1/2005 | Bowman-Amuah | |
| 6,879,944 B1 | 4/2005 | Tipping et al. | |
| 6,907,422 B1 | 6/2005 | Predovic | |
| 6,922,695 B2 | 7/2005 | Skufca et al. | |
| 6,957,186 B1 | 10/2005 | Guheen et al. | |
| 6,990,636 B2 | 1/2006 | Beauchamp et al. | |
| 6,996,565 B2 | 2/2006 | Skufca et al. | |
| 7,035,809 B2 | 4/2006 | Miller et al. | |
| 7,043,476 B2 * | 5/2006 | Robson | 1/1 |
| 7,099,857 B2 | 8/2006 | Lambert | |
| 7,143,091 B2 | 11/2006 | Charnock et al. | |
| 7,155,427 B1 | 12/2006 | Prothia | |
| 7,181,459 B2 | 2/2007 | Grant et al. | |
| 7,249,131 B2 | 7/2007 | Skufca et al. | |
| 7,330,845 B2 | 2/2008 | Lee et al. | |
| 7,487,173 B2 * | 2/2009 | Medicke et al. | 1/1 |
| 7,526,486 B2 | 4/2009 | Cushman, II et al. | |
| 7,567,962 B2 | 7/2009 | Chakrabarti et al. | |
| 7,620,647 B2 | 11/2009 | Stephens et al. | |
| 7,627,550 B1 | 12/2009 | Adams et al. | |
| 7,685,093 B1 | 3/2010 | Adams et al. | |
| 7,698,268 B1 | 4/2010 | Adams et al. | |
| 7,788,274 B1 | 8/2010 | Ionescu | |
| 2002/0007284 A1 | 1/2002 | Schurenberg et al. | |
| 2002/0073099 A1 | 6/2002 | Gilbert et al. | |
| 2002/0080187 A1 | 6/2002 | Lawton | |
| 2002/0087599 A1 | 7/2002 | Grant et al. | |
| 2002/0095421 A1 | 7/2002 | Koskas | |
| 2002/0099694 A1 | 7/2002 | Diamond et al. | |
| 2002/0152422 A1 | 10/2002 | Sharma et al. | |
| 2002/0156917 A1 | 10/2002 | Nye | |
| 2002/0178360 A1 | 11/2002 | Wenocur et al. | |
| 2003/0004770 A1 | 1/2003 | Miller et al. | |
| 2003/0004771 A1 | 1/2003 | Yaung | |
| 2003/0018652 A1 | 1/2003 | Heckerman et al. | |
| 2003/0023773 A1 | 1/2003 | Lee et al. | |
| 2003/0051063 A1 | 3/2003 | Skufca et al. | |
| 2003/0065826 A1 | 4/2003 | Skufca et al. | |
| 2003/0065827 A1 | 4/2003 | Skufca et al. | |
| 2003/0105825 A1 * | 6/2003 | Kring et al. | 709/206 |
| 2003/0120630 A1 | 6/2003 | Tunkelang | |
| 2003/0145002 A1 | 7/2003 | Kleinberger et al. | |
| 2003/0158850 A1 | 8/2003 | Lawrence et al. | |
| 2003/0174179 A1 | 9/2003 | Suemondt et al. | |
| 2003/0182101 A1 | 9/2003 | Lambert | |
| 2003/0195836 A1 | 10/2003 | Hayes et al. | |
| 2003/0195889 A1 * | 10/2003 | Yao et al. | 707/100 |
| 2003/0195890 A1 | 10/2003 | Oommen | |
| 2003/0220858 A1 | 11/2003 | Lam et al. | |
| 2003/0227487 A1 | 12/2003 | Hugh | |
| 2004/0107189 A1 | 6/2004 | Burdick et al. | |
| 2004/0107205 A1 | 6/2004 | Burdick et al. | |
| 2004/0122790 A1 | 6/2004 | Walker et al. | |
| 2004/0143477 A1 | 7/2004 | Wolff | |
| 2004/0143508 A1 | 7/2004 | Bohn et al. | |
| 2004/0181526 A1 | 9/2004 | Burdick et al. | |
| 2004/0181554 A1 | 9/2004 | Heckerman et al. | |
| 2004/0220926 A1 | 11/2004 | Lamkin et al. | |
| 2004/0260694 A1 | 12/2004 | Chaudhuri et al. | |
| 2005/0004895 A1 | 1/2005 | Schurenberg et al. | |
| 2005/0015381 A1 | 1/2005 | Clifford et al. | |
| 2005/0015675 A1 * | 1/2005 | Kolawa et al. | 714/38 |
| 2005/0050068 A1 * | 3/2005 | Vaschillo et al. | 707/100 |

| | | | |
|---|---|---|---|
| 2005/0055345 A1 | 3/2005 | Ripley | |
| 2005/0060286 A1 | 3/2005 | Hansen et al. | |
| 2005/0071194 A1 | 3/2005 | Bormann et al. | |
| 2005/0075917 A1 | 4/2005 | Flores et al. | |
| 2005/0114369 A1 | 5/2005 | Gould et al. | |
| 2005/0149522 A1 | 7/2005 | Cookson et al. | |
| 2005/0154615 A1 | 7/2005 | Rotter et al. | |
| 2005/0210007 A1 | 9/2005 | Beres et al. | |
| 2005/0228808 A1* | 10/2005 | Mamou et al. | 707/100 |
| 2005/0240392 A1 | 10/2005 | Munro et al. | |
| 2005/0256740 A1 | 11/2005 | Kohan et al. | |
| 2005/0256882 A1 | 11/2005 | Able et al. | |
| 2005/0273452 A1 | 12/2005 | Molloy et al. | |
| 2006/0053172 A1 | 3/2006 | Gardner et al. | |
| 2006/0053173 A1 | 3/2006 | Gardner et al. | |
| 2006/0053382 A1 | 3/2006 | Gardner et al. | |
| 2006/0064429 A1 | 3/2006 | Yao | |
| 2006/0080312 A1 | 4/2006 | Friedlander et al. | |
| 2006/0116983 A1 | 6/2006 | Dettinger et al. | |
| 2006/0117032 A1 | 6/2006 | Dettinger et al. | |
| 2006/0129605 A1 | 6/2006 | Doshi | |
| 2006/0129971 A1 | 6/2006 | Rojer | |
| 2006/0136205 A1 | 6/2006 | Song | |
| 2006/0161522 A1 | 7/2006 | Dettinger et al. | |
| 2006/0167896 A1 | 7/2006 | Kapur et al. | |
| 2006/0179050 A1 | 8/2006 | Giang et al. | |
| 2006/0190445 A1 | 8/2006 | Risberg et al. | |
| 2006/0195560 A1 | 8/2006 | Newport | |
| 2006/0265400 A1 | 11/2006 | Fain et al. | |
| 2006/0271549 A1 | 11/2006 | Rayback et al. | |
| 2006/0287890 A1 | 12/2006 | Stead et al. | |
| 2007/0005567 A1 | 1/2007 | Hermansen et al. | |
| 2007/0016450 A1 | 1/2007 | Bhora et al. | |
| 2007/0055647 A1 | 3/2007 | Mullins et al. | |
| 2007/0067285 A1 | 3/2007 | Blume et al. | |
| 2007/0073678 A1 | 3/2007 | Scott et al. | |
| 2007/0073745 A1 | 3/2007 | Scott et al. | |
| 2007/0094060 A1 | 4/2007 | Apps et al. | |
| 2007/0150279 A1 | 6/2007 | Gandhi et al. | |
| 2007/0192715 A1 | 8/2007 | Kataria et al. | |
| 2007/0198481 A1 | 8/2007 | Hogue et al. | |
| 2007/0198600 A1 | 8/2007 | Betz | |
| 2007/0214129 A1 | 9/2007 | Ture et al. | |
| 2007/0214179 A1 | 9/2007 | Hoang | |
| 2007/0217676 A1 | 9/2007 | Grauman et al. | |
| 2007/0250487 A1 | 10/2007 | Reuther | |
| 2007/0260492 A1 | 11/2007 | Feied et al. | |
| 2007/0276844 A1 | 11/2007 | Segal et al. | |
| 2007/0276858 A1 | 11/2007 | Cushman et al. | |
| 2007/0299697 A1 | 12/2007 | Friedlander et al. | |
| 2008/0005106 A1 | 1/2008 | Schumacher et al. | |
| 2008/0016218 A1 | 1/2008 | Jones et al. | |
| 2008/0120432 A1 | 5/2008 | Lamoureaux et al. | |
| 2008/0126160 A1 | 5/2008 | Takuechi et al. | |
| 2008/0243832 A1 | 10/2008 | Adams et al. | |
| 2008/0243885 A1 | 10/2008 | Harger et al. | |
| 2008/0244008 A1 | 10/2008 | Wilkinson et al. | |
| 2009/0089317 A1 | 4/2009 | Ford et al. | |
| 2009/0089332 A1 | 4/2009 | Harger et al. | |
| 2009/0089630 A1 | 4/2009 | Goldenberg et al. | |
| 2009/0198686 A1 | 8/2009 | Cushman, II et al. | |
| 2010/0114877 A1 | 5/2010 | Adams et al. | |
| 2010/0174725 A1 | 7/2010 | Adams et al. | |
| 2010/0175024 A1 | 7/2010 | Schumacher et al. | |
| 2011/0010214 A1 | 1/2011 | Carruth | |
| 2011/0010346 A1 | 1/2011 | Goldenberg et al. | |
| 2011/0010401 A1 | 1/2011 | Adams et al. | |
| 2011/0010728 A1 | 1/2011 | Goldenberg et al. | |
| 2011/0191349 A1 | 8/2011 | Ford et al. | |

FOREIGN PATENT DOCUMENTS

| | | |
|---|---|---|
| WO | 0159586 | 8/2001 |
| WO | 0159586 A2 | 8/2001 |
| WO | 0175679 A1 | 10/2001 |
| WO | 03021485 | 3/2003 |
| WO | 2004023297 A1 | 3/2004 |
| WO | 2004023311 A1 | 3/2004 |
| WO | 2004023345 A1 | 3/2004 |
| WO | 2009042931 A1 | 4/2009 |
| WO | 2009042941 A1 | 4/2009 |

OTHER PUBLICATIONS

Ohgaya, Ryosuke et al., "Conceptual Fuzzy Sets—, NAFIPS 2002, Jun. 27-29, 2002, pp. 274-279.Based Navigation System for Yahoo!".

Xue, Gui-Rong et al., "Reinforcing Web-Object Categorization Through Interrelationships", Data Mining and Knowledge Discover, vol. 12, Apr. 4, 2006, pp. 229-248.

Jason Woods, et al., "Baja Identity Hub Configuration Process", Publicly available on Apr. 2, 2009, Version 1.3.

Initiate Systems, Inc. "Refining the Auto-Link Threshold Based Upon Scored Sample", Publicly available on Apr. 2, 2009; memorandum.

Initiate Systems, Inc. "Introduction", "False-Positive Rate (Auto-Link Threshold)", Publicly available on Apr. 2, 2009; memorandum.

Jason Woods, "Workbench 8.0 Bucket Analysis Tools", Publicly available on Apr. 2, 2009.

"Parsing" Publicly available on Oct. 2, 2008.

Initiate, "Business Scenario: Multi-Lingual Algorithm and Hub," Publicly available on Apr. 2, 2009.

Initiate, "Business Scenario: Multi-Lingual & Many-To-Many Entity Solutions", Publicly available on Apr. 2, 2009.

Initiate, "Relationships-MLH", presentation; Publicly available on Sep. 28, 2007.

Initiate, "Multi-Lingual Hub Support via Memtype Expansion", Publicly available on Apr. 2, 2009.

Initiate Systems, Inc. "Multi-Language Hubs", memorandum; Publicly available on Apr. 2, 2009.

Initiate, "Business Scenario: Support for Members in Multiple Entities", Publicly available on Oct. 2, 2008.

Initiate, "Group Entities", Publicly available on Mar. 30, 2007.

Jim Cushman, MIO 0.5: MIO As a Source; Initiate; Publicly available on Oct. 2, 2008.

Initiate, "Provider Registry Functionality", Publicly available on Oct. 2, 2008.

Edward Seabolt, "Requirement Specification Feature #NNNN Multiple Entity Relationship", Version 0.1—Draft; Publicly available on Oct. 2, 2008.

Initiate, "Arriba Training Engine Callouts", presentation; Publicly available on Mar. 30, 2007.

Initiate, "Business Scenario: Callout to Third Party System", Publicly available on Oct. 2, 2008.

John Dorney, "Requirement Specification Feature #NNNN Conditional Governance", Version 1.0—Draft; Publicly available on Oct. 2, 2008.

Initiate, Release Content Specification, Identity Hub Release 6.1, RCS Version 1.0; Publicly available on Sep. 16, 2005.

Initiate, "Initiate Identity Hub™ Manager User Manual", Release 6.1; Publicly available on Sep. 16, 2005.

End User Training CMT; CIO Maintenance Tool (CMT) Training Doc; Publicly available on Sep. 29, 2006.

"Hierarchy Viewer—OGT 3.0t", Publicly available on Sep. 25, 2008.

"Building and Searching the OGT", Publicly available on Sep. 29, 2006.

Sean Stephens, "Requirement Specification B2B Web Client Architecture", Version 0.1—Draft; Publicly available on Sep. 25, 2008.

"As of: OGT 2.0", Publicly available on Sep. 29, 2006.

Initiate, "Java SDK Self-Training Guide", Release 7.0; Publicly available on Mar. 24, 2006.

Initiate, "Memtype Expansion Detailed Design", Publicly available on Apr. 2, 2009.

Adami, Giordano et al., "Clustering Documents in a Web Directory", WIDM '03, New Orleans, LA, Nov. 7-8, 2003, pp. 66-73.

Chen, Hao et al., "Bringing Order to the Web: Automatically Categorizing Search Results", CHI 2000, CHI Letters, vol. 2, Issue 1, Apr. 1-6, 2000, pp. 145-152.

"Implementation Defined Segments—Exhibit A", Publicly available on Mar. 20, 2008.

Initiate, "Implementation Defined Segments—Gap Analysis", Publicly available on Mar. 20, 2008.

"Supporting Hierarchies", Publicly available on Nov. 29, 2007.
Xue, Gui-Rong et al., "Implicit Link Analysis for Small Web Search", SIGIR '03, Toronto, Canada, Jul. 28-Aug. 1, 2003, pp. 56-63.
Liu, Fang et al., "Personalized Web Search for iMproving Retrieval Effectiveness", IEEE Transactions on Knowledge and Data Engineering vol. 16, No. 1, Jan. 2004, pp. 28-40.
Anyanwu, Kemafor et al. "SemRank: Ranking complex Relationship Search Results on the Semantic Web", WWW 2005, Chiba, Japan May 10-14, 2005, pp. 117-127.
International Preliminary Report on Patentability, PCT/US2008/58404, Mar. 21, 2011, 4 pages.
European Search Report/EP07795659.7, Apr. 15, 2011, 7 pages.
International Search Report and Written Opinion, for PCT/US2007/012073, Mailed Jul. 23, 2008, 12 pages.
International Preliminary Report on Patentability Issued in PCT/US2007/013049, Mailed Dec. 17, 2008.
International Search Report and Written Opinion issued in PCT/US2007/013049, mailed Jun. 13, 2008.
Office Action issued in U.S. Appl. No. 11/809,792, mailed Aug. 21, 2009, 14 pages.
Oracle Data Hubs: "The Emperor Has No Clothes?", Feb. 21, 2005, Google.com, pp. 1-9.
IEEE, no matched results , Jun. 30, 2009, p. 1.
IEEE, no matched results, 1 pg., Sep. 11, 2009.
Office Action issued in U.S. Appl. No. 11/522,223 dated Aug. 20, 2008, 16 pgs.
Office Action issued in U.S. Appl. No. 11/522,223 dated Feb. 5, 2009, Adams, 17 pages.
Notice of Allowance issued for U.S. Appl. No. 11/522,223, dated Sep. 17, 2009, 20 pages.
De Rose, et al. "Building Structured Web Community Portals: A Top-Down, Compositional, and Incremental Approach", VDLB, ACM, pp. 399-410, Sep. 2007.
Microsoft Dictionary, "normalize", at p. 20, Fifth Edition, Microsoft Corp., downloaded from http://proquest.safaribooksonline.com/0735614954 on Sep. 8, 2008.
Office Action issued in U.S. Appl. No. 11/521,928 dated Apr. 1, 2009, 22 pages.
Office Action issued in U.S. Appl. No. 11/521,928 dated Sep. 16, 2008, 14 pages.
Notice of Allowance issued for U.S. Appl. No. 11/521,928, dated Sep. 18, 2009, 20 pages.
Gopalan Suresh Raj, Modeling Using Session and Entity Beans, Dec. 1998, Web Comucopia, pp. 1-15.
Scott W. Ambler, Overcoming Data Design Challenges, Aug. 2001, p. 1-3.
XML, JAVA, and the future of the Web, Bosak, J., Sun Microsystems, Mar. 10, 1997, pp. 1-9.
Integrated Document and Workflow Management applied to Offer Processing a Machine Tool Company, Stefan Morschheuser, et al., Dept. of Information Systems I, COOCS '95 Milpitas CA, ACM 0-89791-706-5/95, p. 106-115.
Hamming Distance, HTML. Wikipedia.org, Available: http://en.wikipedia.org/wiki/Hamming_distance (as of May 8, 2008).
Office Action Issued in U.S. Appl. No. 11/521,946 mailed May 14, 2008, 10 pgs.
Office Action issued in U.S. Appl. No. 11/521,946 mailed Dec. 9, 2008, 10 pgs.
Office Action issued in U.S. Appl. No. 11/521,946 mailed May 13, 2009, 12 pgs.
Freund et al., Statistical Methods, 1993, Academic Press Inc., United Kingdom Edition, pp. 112-117.
Merriam-Webster dictionary defines "member" as "individuals".
Waddington, D., "Does it signal convergence of operational and analytic MDM?" retrieved from the internet:<URL: http://www.intelligententerprise.com>, 2 pages, Aug. 2006.
International Search Report mailed on Oct. 10, 2008, for PCT Application No. PCT/US07/20311 (10 pp).
International Search Report and Written Opinion issued in PCT/US07/89211, mailing date of Jun. 20, 2008.
International Search Report and Written Opinion for PCT/US08/58404, dated Aug. 15, 2008.
International Search Report and Written Opinion mailed on Dec. 3, 2008 for International Patent Application No. PCT/US2008/077985.
Gu, Lifang, et al., "Record Linkage: Current Practice and Future Directions," CSIRO Mathematical and Informational Sciences, 2003, pp. 1-32.
O'Hara-Schettino, et al., "Dynamic Navigation in Multiple View Software Specifications and Designs," Journal of Systems and Software, vol. 41, Issue 2, May 1998, pp. 93-103.
International Search Report and Written Opinion mailed on Oct. 10, 2008 for PCT Application No. PCT/US08/68979.
International Search Report and Written Opinion mailed on Dec. 2, 2008 for PCT/US2008/077970.
International Search Report and Written Opinion mailed on Aug. 28, 2008 for Application No. PCT/US2008/58665, 7 pgs.
C.C. Gotlieb, Oral Interviews with C.C. Gotlieb, Apr. 1992, May 1992, ACM, pp. 1-72.
Google.com, no match results, Jun. 30, 2009, p. 1.
Supplementary European Search Report for EP 07 79 5659 dated May 18, 2010, 5 pages.
European Communication for EP 98928878 (PCT/US9811438) dated Feb. 26, 2006.
European Communication for EP 98928878 (PCT/US9811438) dated Mar. 10, 2008.
European Communication for EP 98928878 (PCT/US9811438) dated Jun. 26, 2006.
Gill, "OX-LINK: The Oxford Medical Record Linkage System", Internet Citation, 1997.
Newcombe et al., "The Use of Names for Linking Personal Records", Journal of the American Statistical Association, vol. 87, Dec. 1, 1992, pp. 335-349.
European Communication for EP 07795659 (PCT/US2007013049) dated May 27, 2010.
Emdad Ahmed, "A Survey on Bioinformatics Data and Service Integration Using Ontology and Declaration Workflow Query Language", Department of Computer Science, Wayne State University, USA, Mar. 15, 2007, pp. 1-67.
International Preliminary Report on Patentability, PCT/US2007/89211, Apr. 30, 2012, 6 pages.
European Search Report/EP07795108.5, May 29, 2012, 6 pages.
Martha E. Fair, et al., "Tutorial on Record Linkage Slides Presentation", Chapter 12, pp. 457-479, Apr. 1997.

* cited by examiner

Group Permissions

Composite Views | Interactions | Sources | Member Attributes | Segment Attributes

| Include | Name |
|---|---|
| ☑ | Amethyst River Hospital |
| ☑ | BILL |
| ☑ | CVOS |
| ☑ | FACT |
| ☑ | Frequence Guest Program |
| ☑ | Fullerton General Hospital |
| ☑ | LEAD |
| ☑ | Methodist Hospital |

☑ Select All

*FIG. 5A*

Group Permissions

Composite Views | Interactions | Sources | Member Attributes | Segment Attributes

| Include | Name | Read Only |
|---|---|---|
| ☑ | APPT | ☐ |
| ☑ | Address | ☐ |
| ☑ | American Airlines Number | ☐ |
| ☑ | Birth Date | ☐ |
| ☑ | Birth Month-Day | ☐ |
| ☑ | Chart ID | ☐ |
| ☑ | Cust Company Name | ☐ |
| ☑ | DEA | ☐ |

☑ Select All

*FIG. 5B*

Group Permissions

| Composite Views | Interactions | Sources | Member Attributes | Segment Attributes |

| Include | Name | Read Only |
|---|---|---|
| ☑ | mpi_appdata | ☐ |
| ☑ | mpi_apphead | ☐ |
| ☑ | mpi_appprop | ☐ |
| ☑ | mpi_bktfunc | ☐ |
| ☑ | mpi_cmpfunc | ☐ |
| ☑ | mpi_cmphead | ☐ |
| ☑ | mpi_cmpspec | ☐ |
| ☑ | mpi_cvwhead | ☐ |

☑ Select All

*FIG. 5C*

706 — mpi_segattr

| | attrrecno |
|---|---|
| FK1 | caudrecno<br>maudrecno<br>recstat<br>memtypeno<br>segcode<br>attrcode<br>attrname<br>attrlabel<br>attrdesc<br>edtcode<br>isvirtual<br>adtrole<br>nsactive<br>nsexists<br>msfilter |

702 — mpi_seghead

| segcode |
|---|
| caudrecno<br>maudrecno<br>recstat<br>segrecno<br>segname<br>objcode<br>hasattr<br>engineonly<br>segverno |

704 — mpi_segxfld

| | segcode |
|---|---|
| FK1 | fldseqno |
| | caudrecno<br>maudrecno<br>recstat<br>fldname<br>fldlabel<br>fldtype<br>fldlength<br>ispkey<br>isrequired<br>isvirtual |

| Name | Code | Object Code | Object Code | Attribute | Engine Only | Status |
|---|---|---|---|---|---|---|
| mpi_memhead | MEMHEAD | mem | | No | No | Active |
| mpi_membktd | MEMBKTD | mem | | No | Yes | Active |
| mpi_memcmpd | MEMCMPD | mem | | No | Yes | Active |
| mpi_memqryd | MEMQRYD | mem | | No | Yes | Active |
| mpi_memique | MEMHIQUE | mem | | No | Yes | Active |
| mpi_memoque | MEMOQUE | mem | | No | No | Active |
| mpi_memnote | MEMNOTE | mem | | No | No | Active |
| mpi_memxeia | MEMXEIA | mem | | No | No | Active |
| mpi_memxtsk | MEMXTSK | mem | | No | No | Active |
| mpi_memlink | MEMLINK | mem | | No | Yes | Active |
| mpi_memrule | MEMRULE | mem | | No | Yes | Active |
| mpi_entique | ENTIQUE | mem | | No | No | Active |
| mpi_entoque | ENTOQUE | mem | | No | No | Active |
| mpi_entnote | ENTNOTE | mem | | No | No | Active |
| mpi_entxeia | ENTXEIA | mem | | No | No | Active |
| mpi_entxtsk | ENTXTSK | mem | | No | No | Active |
| mpi_entlink | ENTLINK | mem | | No | No | Active |
| mpi_entrule | ENTRULE | mem | | No | No | Active |
| mpi_memattr | MEMATTR | mem | | Yes | No | Active |
| mpi_memenum | MEMENUM | mem | | Yes | No | Active |
| mpi_memname | MEMNAME | mem | | Yes | No | Active |
| mpi_memaddr | MEMADDR | mem | | Yes | No | Active |
| mpi_memphone | MEMPHONE | mem | | Yes | No | Active |
| mpi_memident | MEMIDENT | mem | | Yes | No | Active |
| mpi_memdate | MEMDATE | mem | | Yes | No | Active |
| mpi_memtext | MEMTEXT | mem | | Yes | No | Active |

FIG. 8

Add Segment

Add new data segment.

Segment Information

Table Name: mpi_memcust

Code: MEMCUST

Object Code: Member ▼
- ☑ Attribute
- ☐ Engine Only

Status: ○ Active  ◉ Inactive

Definition

| Field # | Field Name | Label | Data Type | Length | Required |
|---|---|---|---|---|---|
| 1 | custname | custName | VARCHAR | 40 | N |
| 2 | custid | custId | UDWORD | 0 | Y |
| 3 | custphone | custPhone | VARCHAR | 20 | N |
| 4 | custsince | custSince | DTTM | 0 | N |

⇦ Up    ⇨ Down

802

⊕ Add Field    ✎ Update Field    ⊖ Delete Field    ✕ Generate DDL

🗆 Add    ✕ Cancel

IMPLEMENTATION DEFINED SEGMENTS FOR RELATIONAL DATABASE SYSTEMS

CROSS-REFERENCE TO RELATED APPLICATIONS

This application claims priority from U.S. Provisional Application No. 60/845,073, filed Sep. 15, 2006, entitled "METHOD AND SYSTEM FOR IMPLEMENTATION DEFINED SEGMENTS USING META-DATA," which is fully incorporated by reference herein.

TECHNICAL FIELD

This disclosure relates generally to relational database systems and more particularly to data structures and processing in relational database systems. Even more particularly, embodiments disclosed herein relate to a system and method of creating implementation defined segments at runtime based on metadata.

BACKGROUND

For a software system to support the data needs of two or more vertical industries, it usually must make compromises in what data is available, or provide a large superset (e.g. the ability to encompass the data needs of all the industries it is desired to support) with many unused data items in order to satisfy the greatest common denominator. For instance, those demographic data items that may be important in a medical record registration application, may not have any use to a hotels central reservation system.

One way to support multiple vertical markets with the same application or software system (product) is to have a very generic data storage capability which does not have anything specific to a given industry, application or format. The problem with this approach is that the data items which are specific to an industry or application may be those that are most valuable to the customer. Some industries have Electronic Data Interchange Standards that can be used, but they do not fit every application and rarely have wide acceptance.

Another solution to the above problem is to create a large, all encompassing data model which tries to anticipate every conceivable contingency. This is cumbersome to install, and requires that the users wade through unused scaffolding if their particular business does not require the extra fields. And despite best efforts, they may still have requirements which are not included in the model.

BRIEF SUMMARY OF THE DISCLOSURE

Embodiments disclosed herein provide systems and methods that can eliminate or reduce the disadvantages of previously developed solutions to supporting multiple vertical industries with the same software system. More particularly, embodiments disclosed herein provide a way to describe data objects that will be used by the Initiate Identity Hub™ Software, and to store that description inside the Identity Hub database in a set of metadata tables known generically as the data dictionary. Initiate™ and Initiate Identity Hub™ are trademarks of Initiate Systems, Inc. Once a data object has been described, the Identity Hub can use the information to:
1. Define persistent storage for the object in the database for any relational database management system (RDBMS) type supported by the Identity Hub software;
2. Create internal structures to hold the data and process business rules and demographic comparisons against the data object;
3. Create the on-the-wire protocol definition that describes the data object to remote clients using APIs such as the Initiate Identity Hub APIs. The communication software (e.g., contained in the Identity Hub) can transmit and receive these data objects without prior, hard coded knowledge; and
4. Provide a mechanism in the APIs to query the Identity Hub at runtime about what data objects exist, what fields and data types they contain, and additionally how they might be displayed or formatted on various clients.

Embodiments disclosed herein may be implemented entirely in software or may be implemented at least partially in hardware.

By adopting embodiments disclosed here to generate Implementation Defined Segments (IDS), software implementers (e.g., partners, customers, or Initiate services employees) can create custom attribute segments on an installation by installation basis. The users of the Initiate Identity Hub software can benefit from having access to the data that is vital to their industry or application specific data needs. Each customer does not have to conform to some pre-defined, limiting data model. Moreover, there is no need to create custom application code for sites that want to take advantage of this feature. The IDS data segments will behave substantially exactly like hard-coded, pre-defined segments. The legacy pre-defined segments in use in older implementations can use the IDS technology under the covers, and over time the pre-defined segments can be deprecated, and replaced with a pure IDS implementation.

Other features, advantages, and objects of the disclosure will be better appreciated and understood when considered in conjunction with the following description and the accompanying drawings.

BRIEF DESCRIPTION OF THE SEVERAL VIEWS OF THE DRAWINGS

A more complete understanding of the present invention and the advantages thereof may be acquired by referring to the following description, taken in conjunction with the accompanying drawings in which like reference numbers indicate like features and wherein:

FIGS. 5A-5C show screenshots of one embodiment of a Security component of Identity Hub Manager of FIG. 4 in which segment attributes are used to set up Group Permissions;

FIG. 6 shows a screenshot of one embodiment of a Data Dictionary component of Identity Hub Manager of FIG. 4;

FIG. 7 depicts a schematic representation of one embodiment of metadata tables for defining Implementation Defined Segments;

FIG. 8 shows a screenshot of one embodiment of an Add Segment component of Identity Hub Manager of FIG. 4 through which Implementation Defined Segments can be added;

Skilled artisans appreciate that elements in the figures are illustrated for simplicity and clarity and are not necessarily drawn to scale.

DETAILED DESCRIPTION

Preferred embodiments of the present invention and the various features and advantageous details thereof are explained more fully with reference to the examples illustrated in the accompanying drawings where like numerals are used to refer to like and corresponding parts or elements. Descriptions of known computer languages, data structures, programming techniques, operating systems, network protocols, and the like are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Figure 1:
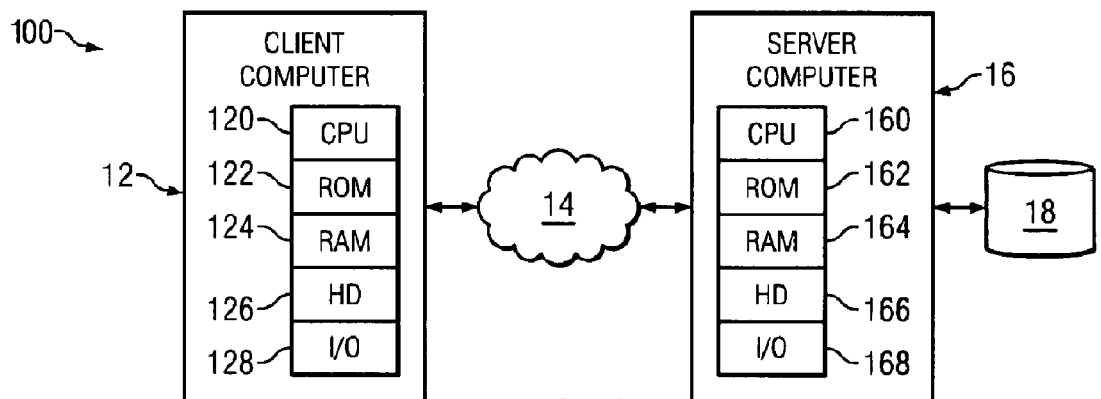
FIG. 1 depicts a simplified schematic representation of one embodiment of a computer network which includes a client computer and a server computer.

FIG. 1 illustrates an exemplary network architecture 100 in which embodiments disclosed herein may be implemented. Architecture 100 includes client computer 12 that is bi-directionally coupled to network 14, and server computer 16 that is bi-directionally coupled to network 14 and database 18. Client computer 12 includes central processing unit ("CPU") 120, read-only memory ("ROM") 122, random access memory ("RAM") 124, hard drive ("HD") or storage memory 126, and input/output device(s) ("I/O") 128. I/O devices 128 can include a keyboard, monitor, printer, electronic pointing device (e.g., mouse, trackball, etc.), or the like. Server computer 16 can include CPU 160, ROM 162, RAM 164, HD 166, and I/O 168.

Each of client and server computers 12 and 16 is an example of a data processing system. ROM 122 and 162, RAM 124 and 164, HD 126 and 166, and database 18 include media that can be read by CPU 120 or 160. Therefore, each of these types of memories includes a data processing system readable medium. Within this disclosure, the term "data processing system readable medium" is used interchangeably with the term "computer-readable storage medium." These memories may be internal or external to computers 12 and 16.

Figure 2:
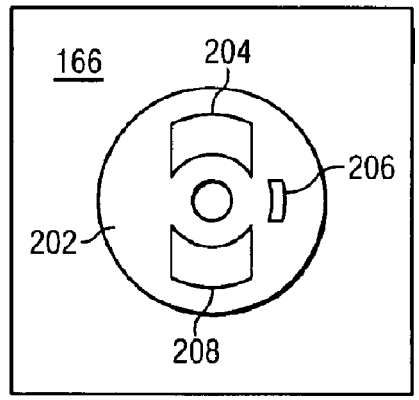
FIG. 2 depicts a simplified schematic representation of one embodiment of a computer readable storage medium carrying computer-executable instructions.

Embodiments described herein may be implemented in suitable software code that may reside within ROM 122 or 162, RAM 124 or 164, or HD 126 or 166. In addition to those types of memories, some instructions implementing embodiments disclosed herein may be contained on a data storage device with a different data processing system readable storage medium, such as a floppy diskette. FIG. 2 illustrates a combination of software code elements 204, 206, and 208 that are embodied within a data processing system readable medium 202, on HD 166. Alternatively, the instructions may be stored as software code elements on a DASD array, magnetic tape, floppy diskette, optical storage device, or other appropriate data processing system readable medium or storage device.

In an illustrative embodiment, the computer-executable instructions may be lines of compiled C++, Java, or other language code. Other computer architectures may be used.

For example, some functions of client computer 12 may be incorporated into server computer 16, and vice versa. Further, other client computers (not shown) or other server computers (not shown) similar to client computer 12 and server computer 16, respectively, may also be connected to network 14.

Communications between client computer 12 and server computer 16 can be accomplished using electronic, optical, radio frequency, or other signals. When a user is at client computer 12, client computer 12 may convert the signals to a human understandable form when sending a communication to the user and may convert input from a human to appropriate electronic, optical, radio frequency, or other signals to be used by client computer 12 or server computer 16.

Figure 3:
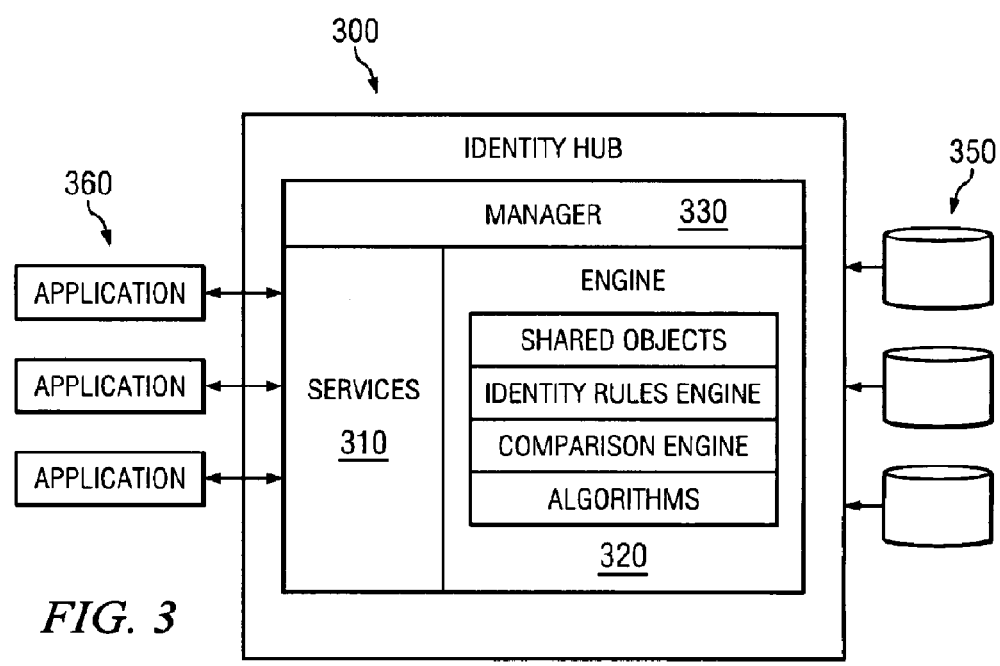
FIG. 3 depicts a schematic representation of one embodiment of an exemplary Identity Hub.
Figure 10:
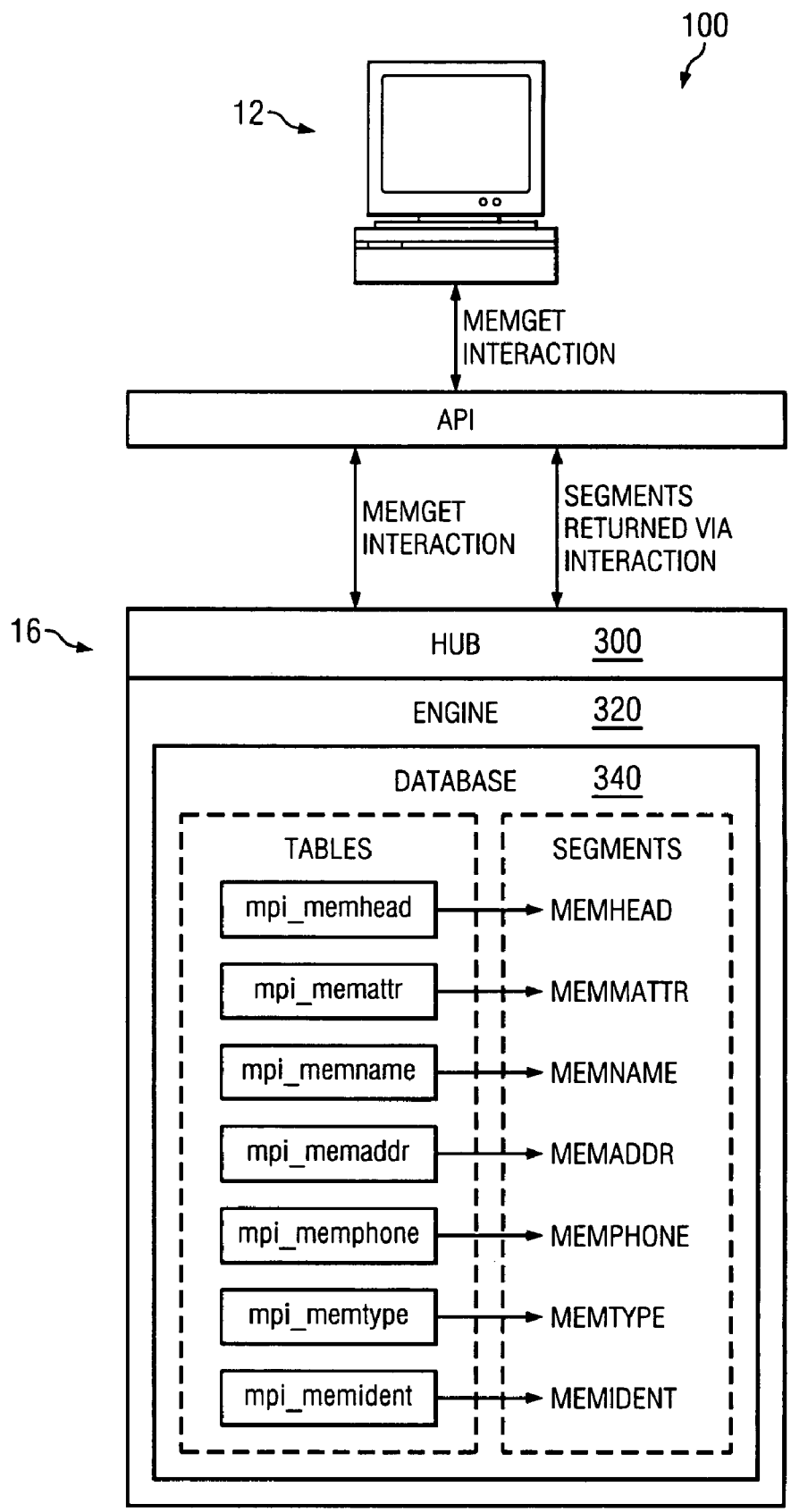
FIG. 10 depicts a schematic representation of one embodiment of an exemplary method of accessing data segments in a computer network.

FIG. 3 depicts a simplified schematic representation of one embodiment of Initiate Identity Hub 300. In some embodiments, Hub 300 resides on a server computer (e.g., server computer 16). As an example, Hub 300 can be seen as a customer data integration hub that is built to operate in a network environment (e.g., Service-Oriented Architecture (SOA) environment) and can support any business application that uses Web Services, providing a layer of business services for accessing and manipulating the customer data. Components of Hub 300 may include Services 310, Engine 320, Manager 330, and Database 340 (FIG. 10). Services 310 contains software code including computer-executable instructions implementing Web services, interfaces (e.g., PDS, Java, C++ application programming interfaces (API), etc.), and inbound/outbound brokers (e.g., inbound and message managers, etc.) for handling incoming/outgoing requests/responses (e.g., connection requests, authentication, authorization, etc.). In some embodiments, components of Engine 320 may include shared objects, identity rules engine, comparison engine, and algorithms. Engine 320 is built to perform core functions of Hub 300 including strategic customer data integration, identification and recognition operations that generate results that are consumable by external systems as part of an SOA. Functionality of Engine 320 may be managed via Manager 330, some of which will be described in further detail below.

Embodiments of Hub 300 provide accurate, scalable, and deployable solutions for customer-centric master data management as Hub 300 enables business entities to create complete, real-time views of data from various data sources 350 and applications 360 to more effectively manage, control, analyze and integrate customer, patient or constituent information and relationships while protecting data privacy. In particular, Hub 300 has the ability to handle hundreds of millions of records in sub-second response times with unique proprietary matching and linking technology that identifies and resolves information routinely, even when there is duplicate, fragmented or incomplete data. Within this context, Manager 330, embodied in a software application, enables administrators and implementers (i.e., system administrators, application administrators, database administrators, software developers, software engineers, system architect, and those responsible for implementing Initiate™ software applications) to easily manage Hub 300 software environment via a user interface. In this example, Manager 330 is installed on a server and accessible via an Intranet. In some embodiments, Manager 330 can be installed and run directly on a workstation.

Figure 4:
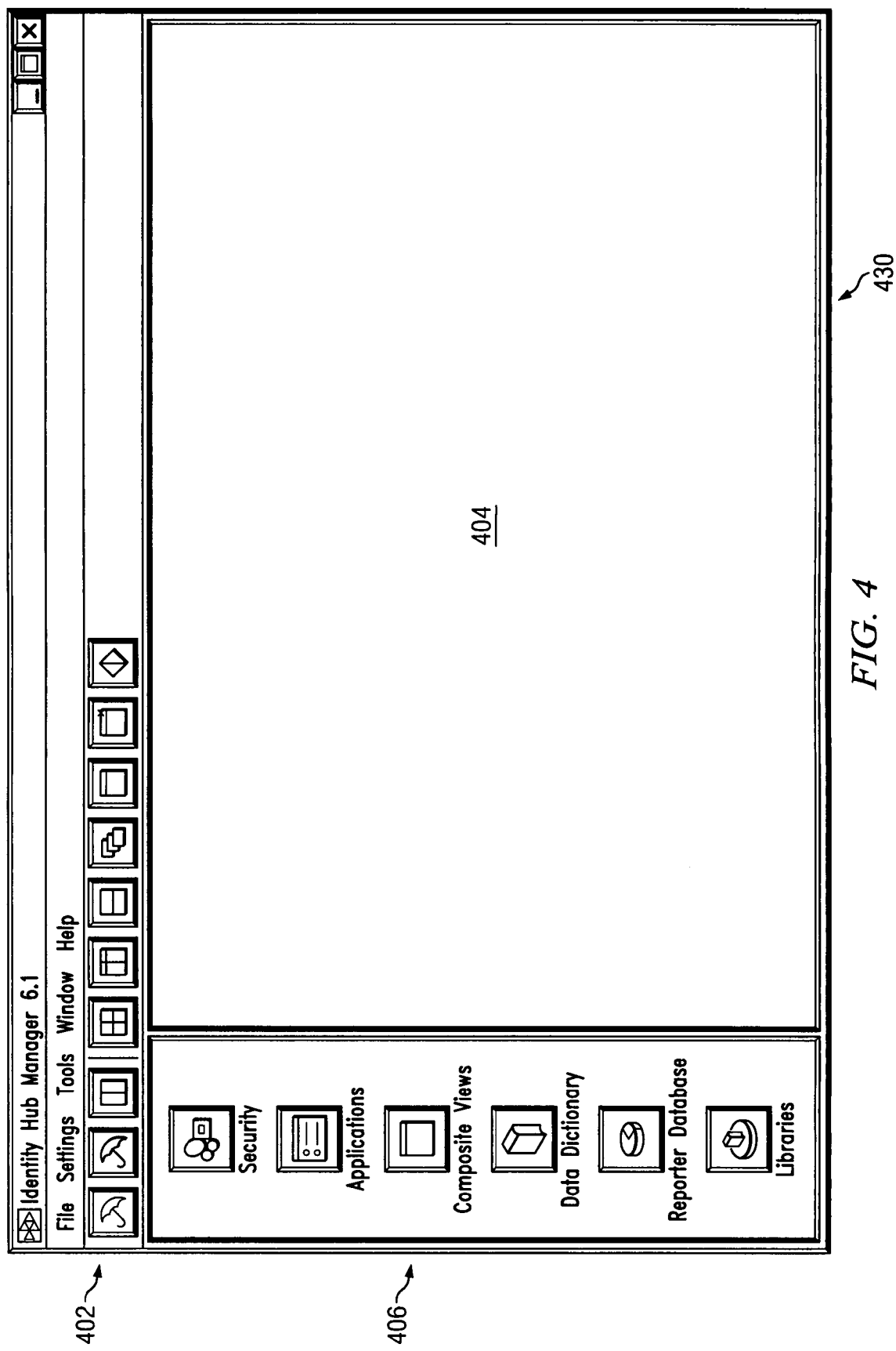
FIG. 4 shows a screenshot of one embodiment of an exemplary Identity Hub Manager.

FIG. 4 shows a screenshot of one embodiment of exemplary user interface 430 of Manager 330. In this example, user interface 430 has top menu area 402, side menu area 406, and workspace 404. In some embodiments, side menu area 406 displays selectable icons with links to a plurality of functions, including Security for setting and maintaining user security, Applications for managing Initiate™ applications, Composite Views for creating composite views (which can be used by other applications such as the Initiate™ Enterprise Viewer application), Data Dictionary for viewing and editing data dictionary tables, Reporter Database for scheduling and running the reporting database extraction process, and Libraries for viewing and editing libraries and library functions (e.g., standardization, derived data, bucketing, and comparison). Embodiments described below are directed to Implementation Defined Segments that can be created through Data Dictionary for use by other components/applications such as Security.

FIGS. 5A-5C show screenshots of one embodiment of a Security component of Identity Hub Manager 330 in which segment attributes are used to set up Group Permissions. In an enterprise environment, a user can be assigned to and thus affiliated with one or more groups that best fit their individual job requirements. For example, a manager in a company may need to look at member records and understand what records are involved in certain tasks, but not actually work the tasks. In that case, a group can be created with group permissions for member searches, member retrieves, and task searches. A group of users responsible for working the tasks would need additional permissions that would enable them to edit records, tasks, and attributes. FIG. 5A shows a screenshot of an exemplary Group Permissions window having a plurality of tabs including Composite Views, Interactions, Sources Member Attributes, and Segment Attributes. Each of the tabs enables an administrator/implementer to specifically define a particular type of permissions for each user group. For example, through the Composite Views tab, the administrator/implementer can select/unselect different types of views allowed for each group; through the Interactions tab, the administrator/implementer can define what actions that members of a group can perform; through the Sources tab, the administrator/implementer can restrict group member access to a specific data source or sources (e.g., hospitals; see FIG. 5A); through the Member Attributes tab, the administrator/implementer can identity what attributes (e.g., Address, Birth Date, etc.) a particular group can see (see FIG. 5B); and through the Segment Attributes (e.g., mpi_appdata, etc.; see FIG. 5C), the administrator/implementer can identify what data segments (e.g., member segments such as mpi_memname, mpi_memaddr, mpi_memdate, etc.) a particular group can use (see FIG. 6).

Data segments or simply segments coincide with data schema of Hub 300 to define behavior of Engine 320 and member information. In some embodiments, a set of pre-defined ("fixed") segments are created and packaged with Hub 300 prior to deployment. In some embodiments, implementers can add member-attribute implementation defined ("custom") segments through Manager 330 upon/after deployment. Within this disclosure, each segment is a data structure which encapsulates a single row from the coinciding database table. In embodiments disclosed herein, segments are used as data storage structures for data that may be read from a database (e.g., database 350), or sent in from a client application (e.g., application 360). When Engine 320 operates on data, it passes around a set of these segment objects (i.e., they are Shared Objects).

FIG. 6 shows a screenshot of one embodiment of exemplary Data Dictionary 600 of Manager 330. In this example, Data Dictionary 600 has a plurality of tabs including Segments 602 for viewing and editing segments. Segments can be added by selecting Add Segment icon or button 604. Unlike pre-defined segments (e.g., MemName, MemAddr, MemIdent, etc.) which are created and then shipped to customers as part of Hub 300, implementation defined segments (IDS) are created at the time Hub 300 is implemented—by an implementer or an administrator—and therefore are not associated with a generated class. In some embodiments, when a segment is added an associated Data Definition Language (DDL) statement is also added. In some embodiments, each time an IDS is changed, an associated DDL statement is generated. Examples of DDL statements generated by Manager 330 are provided below.

In some embodiments, there are three types of segments: dictionary segments, member segments, and audit segments. Audit segments enable reporting and tracking. Member segments define individual entities (i.e., members and members associated with an entity), member attributes, and task workflow. In some embodiments, only member attribute segments can be defined at the time of implementation. Dictionary segments contain type definition and lookup values. These values define customer specific data, engine behavior, and other segment types. Dictionary segments can be divided into five sections.

a. Type Definition—provides lookup values to define data types used by Hub 300;

b. Segment Definitions—enable the definition of internal (internal to Hub 300) and customer-specific (i.e., implementation defined) segments that are maintained by Hub 300;

c. Source Definitions—enable the definition of source systems recognized by Hub 300 and the interactions therebetween;

d. Use Segments—provide Hub 300 specific configuration that defines behavior of Engine 320, which includes comparison, derived data, and standardization strategies, as well as linkage rules and other behavior rules; and e. User Access Definition Segments—define valid Hub 300 users and their associated access control rules, including user IDs and permissions.

In FIG. 6, column Name lists physical (database) table name(s) for the data segment storage; column Code lists segment code name(s); column Object Code defines the segment type (e.g., dictionary, member, or audit) of a segment; column Attribute identifies whether a particular segment contains attribute data; column Engine Only identifies whether a particular segment is an engine configuration segment only; and column Status indicates if a particular segment is Active (i.e., in-use) or Inactive. In some embodiments, Engine 320 must be restarted before a newly added segment can be marked as Active.

In the past, a segment was defined by what was referred to as a package. Packages were hard-coded C language structures that defined the data fields, what data type those fields were, and how the system should treat those fields. Packages proved to be a very powerful way to describe data in a manner that the rest of the Initiate Identity Hub™ software could use to operate on the data. However, because these packages were hard-coded C language structures, if a new segment definition is needed, a code change had to be made in the Initiate Identity Hub™ engine, a database table that matched the change had to be made, and any API changes needed for others to be able to access the new segment also had to be made.

Embodiments of an Implementation Defined Segments subsystem disclosed herein represent an innovative way to support new segments without having to ship and support new code at each customer site that has unique data requirements. Instead of the package mechanism described above, a set of database tables, also referred to as metadata tables, would be read at system start-up to define the shape of the package data structures. If an implementer or administrator needs to change a segment, or add a new one, the implementer/administrator could just add the proper data to the database, and on the next restart of Engine 320, Hub 300 would behave exactly as if the segment information had been hard-coded in the packages.

FIG. 7 depicts a schematic representation of one embodiment of metadata tables for defining Implementation Defined Segments. Two tables, mpi_seghead 702 and mpi_segxfld 704, are used to describe a segment for use by Engine 320. Mpi_seghead 702 contains the unique name of the segment (i.e., one row exists for each segment definition). This is joined to mpi_segxfld 704 which defines the individual fields contained in each segment in mpi_seghead 702. Mpi_segattr 706 does not define the shape or structure of the data. Rather, Mpi_segattr 706 defines the role in which a particular data segment will be used. For example, an implementer could define a segment called "phone" which would have a row in mpi_seghead 702, then one or more rows in mpi_segxfld 704 describing the fields which make up a "phone" segment. As an example, mpi_segxfld 704 might contain fields for the international calling code, the area code, prefix, and the local number itself. Once this "phone" segment is defined, several roles for this shaped segment can be defined by making rows in mpi_segattr 706 for HOMEPHONE, WORKPHONE, or MOBILEPHN. This would allow the implementer to logically separate the generic phone data segment into logical rows for specific processing. Detailed definitions of these metadata tables are provided in Tables 1-3 below. Examples are provided in Tables 4-5 below.

TABLE 1 mpi_seghead Details

| Expanded name | Segment Definition Header |
|---|---|
| Initiate ™ software use | This dictionary table provides the bridge between the logical names for storage segments, and the physical tables in which they are stored. | mpi_seghead Attribute Descriptions

| Attribute | Description |
|---|---|
| caudrecno | Creation of this particular record, from mpi_audhead |
| maudrecno | Last time the record value was modified, from mpi_audhead |
| recstat | Record status - 'A'ctive, 'I'nactive, 'D'eleted, 'S'hadow |
| segrecno | Unique segment identifier - surrogate key for segcode |
| segcode | Segment code definition - primary key |
| segname | Physical table name for data segment storage |
| objcode | Internal Initiate ™ software usage |
| hasattr | (Y/N) Contains member attribute data |
| engineonly | (Y/N) Engine configuration items only |
| segverno | Used for dictionary segment versioning to support multiple servers |

TABLE 2 mpi_segxfld Details

| Expanded name | Segment-to-Field Association |
|---|---|
| Initiate ™ software use | This dictionary table provides the engine with information on the fields that are available in each segment. |
| Cross reference | This table cross-references mpi_seghead through segcode. | mpi_segxfld Attribute Descriptions

| Attribute | Description |
|---|---|
| caudrecno | Creation of this particular record, from mpi_audhead |
| maudrecno | Last time the record value was modified, from mpi_audhead |
| recstat | Record status - 'A'ctive, 'I'nactive, 'D'eleted, 'S'hadow |
| segcode | Segment code, from mpi_seghead |

TABLE 2-continued

| fldseqno | Field sequence number |
|---|---|
| fldname | Field name |
| fldtype | Initiate standard datatype (char, varchar, date, time, datetime, integer, smallint) |
| fldlength | Field length - 0 for all types except char/varchar |
| ispkey | Flag whether field is primary key |
| isrequired | Flag whether field is required |
| isvirtual | Flag whether field is virtual (non database) |

TABLE 3 mpi_segattr Details

| Expanded name | Segment Attribute Definitions |
|---|---|
| Initiate ™ software use | This dictionary table describes the named attributes that Initiate Identity Hub ™ software stores using the primary Initiate ™ data types. | mpi_segattr Attribute Descriptions

| Attribute | Description |
|---|---|
| caudrecno | Creation of this particular record, from mpi_audhead |
| maudrecno | Last time the record value was modified, from mpi_audhead |
| recstat | Record status - 'A'ctive, 'I'nactive, 'D'eleted, 'S'hadow |
| attrrecno | Attribute record number - Surrogate key for attrcode |
| memtypeno | Member type |
| segcode | Storage segment code from mpi_seghead (specifies physical table) |
| attrcode | Attribute code - primary key for this table |
| attrname | Attribute name |
| attrlabel | Attribute label, can be used for reports or interactive screen displays |
| attrdesc | Longer text description of the attribute |
| edtcode | Enumerated data type, if applicable, from mpi_edthead |
| isvirtual | Flag indicating if this segment is physical or virtual |
| adtrole | Abstract Data Type Role - unused at this time |
| nsactive | Number of allowable active-status instances for an attribute type (applies at a memrecno-atterecno-asaidxno level).* |
| nsexists | The maximum number of a member's attrcodes instances (applies at a memrecno-atterecno-asaidxno level). The system trims off any instances greater than this number.* |
| msfilter | Status filter for records |

*Special Values
nsactive:
  0  Determines the number of active values to maintain for this member. 0 or 1 retains one active value of an attribute type; the MCA attribute is the active attribute and all previous values become inactive. 2 maintains two active values, and so on.
nsexists:
  0  0 = no restriction on the number of attribute values stored for member; do not trim off any historical attribute values.
  >0  Any number above 0 tells the system to trim (delete) any historical attribute values above that number. For instance, if nsexists is set to 3, there are 3 values for the HOMEADDR attribute. If a member is updated to add a $4^{th}$, then the oldest value is deleted.

TABLE 4 mpi_seghead

| caudrecno | maudrecno | recstat | segrecno | segcode | segname | objcode | hasattr | engineonly | segverno |
|---|---|---|---|---|---|---|---|---|---|
| 1 | 1 | A | 1 | SYSKEY | mpi_syskey | dic | N | N | 0 |
| 1 | 1 | A | 2 | SYSPROP | mpi_sysprop | dic | N | Y | 0 |
| 1 | 1 | A | 3 | APPHEAD | mpi_apphead | dic | N | N | 0 |
| 1 | 1 | A | 4 | APPPROP | mpi_appprop | dic | N | N | 0 |
| 1 | 1 | A | 5 | APPDATA | mpi_appdata | dic | N | N | 0 |
| 1 | 1 | A | 6 | SEQGEN | mpi_seqgen | dic | N | Y | 0 |
| 1 | 1 | A | 7 | STRHEAD | mpi_strhead | dic | N | N | 0 |
| 1 | 1 | A | 8 | STRXSTR | mpi_strxstr | dic | N | N | 0 |
| 1 | 1 | A | 9 | STRANON | mpi_stranon | dic | N | N | 0 |
| 1 | 1 | A | 10 | STREQUI | mpi_strequi | dic | N | N | 0 |
| 1 | 1 | A | 11 | STRFREQ | mpi_strfreq | dic | N | N | 0 |
| 1 | 1 | A | 12 | STRWORD | mpi_strword | dic | N | N | 0 |
| 1 | 1 | A | 13 | STREDIT | mpi_stredit | dic | N | N | 0 |
| 1 | 1 | A | 14 | STRNBKT | mpi_strnbkt | dic | N | N | 0 |
| 1 | 1 | A | 15 | STRSBKT | mpi_strsbkt | dic | N | N | 0 |
| 1 | 1 | A | 16 | WGTHEAD | mpi_wgthead | dic | N | N | 0 |
| 1 | 1 | A | 17 | WGTXWGT | mpi_wgtxwgt | dic | N | N | 0 |
| 1 | 1 | A | 18 | WGT1DIM | mpi_wgt1dim | dic | N | N | 0 |
| 1 | 1 | A | 19 | WGT2DIM | mpi_wgt2dim | dic | N | N | 0 |
| 1 | 1 | A | 20 | WGT3DIM | mpi_wgt3dim | dic | N | N | 0 |
| 1 | 1 | A | 21 | WGT4DIM | mpi_wgt4dim | dic | N | N | 0 |
| 1 | 1 | A | 22 | WGTNVAL | mpi_wgtnval | dic | N | N | 0 |
| 1 | 1 | A | 23 | WGTSVAL | mpi_wgtsval | dic | N | N | 0 |
| 1 | 1 | A | 24 | EDTHEAD | mpi_edthead | dic | N | N | 0 |
| 1 | 1 | A | 25 | EDTELEM | mpi_edtelem | dic | N | N | 0 |
| 1 | 1 | A | 26 | LIBHEAD | mpi_libhead | dic | N | N | 0 |
| 1 | 1 | A | 27 | STDFUNC | mpi_stdfunc | dic | N | N | 0 |
| 1 | 1 | A | 28 | DVDFUNC | mpi_dvdfunc | dic | N | N | 0 |
| 1 | 1 | A | 29 | BKTFUNC | mpi_bktfunc | dic | N | N | 0 |
| 1 | 1 | A | 30 | CMPFUNC | mpi_cmpfunc | dic | N | N | 0 |
| 1 | 1 | A | 31 | EXCFUNC | mpi_excfunc | dic | N | N | 0 |
| 1 | 1 | A | 32 | DVDHEAD | mpi_dvdhead | dic | N | N | 0 |
| 1 | 1 | A | 33 | DVDXSTD | mpi_dvdxstd | dic | N | N | 0 |
| 1 | 1 | A | 34 | DVDXCMP | mpi_dvdxcmp | dic | N | N | 0 |
| 1 | 1 | A | 35 | DVDXQRY | mpi_dvdxqry | dic | N | N | 0 |
| 1 | 1 | A | 36 | DVDXBKT | mpi_dvdxbkt | dic | N | N | 0 |
| 1 | 1 | A | 37 | DVDYBKT | mpi_dvdybkt | dic | N | N | 0 |
| 1 | 1 | A | 38 | CMPHEAD | mpi_cmphead | dic | N | N | 0 |
| 1 | 1 | A | 39 | CMPSPEC | mpi_cmpspec | dic | N | N | 0 |
| 1 | 1 | A | 40 | EXCHEAD | mpi_exchead | dic | N | N | 0 |
| 1 | 1 | A | 41 | EXCSPEC | mpi_excspec | dic | N | N | 0 |
| 1 | 1 | A | 42 | EVTTYPE | mpi_evttype | dic | N | N | 0 |
| 1 | 1 | A | 43 | ENTTYPE | mpi_enttype | dic | N | N | 0 |
| 1 | 1 | A | 44 | MEMTYPE | mpi_memtype | dic | N | N | 0 |
| 1 | 1 | A | 45 | MEMSTAT | mpi_memstat | dic | N | N | 0 |
| 1 | 1 | A | 46 | EIATYPE | mpi_eiatype | dic | N | N | 0 |
| 1 | 1 | A | 47 | EIASTAT | mpi_eiastat | dic | N | N | 0 |
| 1 | 1 | A | 48 | TSKTYPE | mpi_tsktype | dic | N | N | 0 |
| 1 | 1 | A | 49 | TSKSTAT | mpi_tskstat | dic | N | N | 0 |
| 1 | 1 | A | 50 | IXNHEAD | mpi_ixnhead | dic | N | Y | 0 |
| 1 | 1 | A | 51 | SEGHEAD | mpi_seghead | dic | N | Y | 0 |
| 1 | 1 | A | 52 | SEGATTR | mpi_segattr | dic | N | N | 0 |
| 1 | 1 | A | 53 | SEGXFLD | mpi_segxfld | dic | N | N | 0 |
| 1 | 1 | A | 54 | SRCHEAD | mpi_srchead | dic | N | N | 0 |
| 1 | 1 | A | 65 | SRCATTR | mpi_srcattr | dic | N | N | 0 |
| 1 | 1 | A | 66 | SRCXENT | mpi_srcxent | dic | N | N | 0 |
| 1 | 1 | A | 55 | SRCXSRC | mpi_srcxsrc | dic | N | N | 0 |
| 1 | 1 | A | 56 | CVWHEAD | mpi_cvwhead | dic | N | N | 0 |
| 1 | 1 | A | 57 | CVWXSEG | mpi_cvwxseg | dic | N | N | 0 |
| 1 | 1 | A | 58 | GRPHEAD | mpi_grphead | dic | N | N | 0 |
| 1 | 1 | A | 59 | GRPXIXN | mpi_grpxixn | dic | N | N | 0 |
| 1 | 1 | A | 60 | GRPXCVW | mpi_grpxcvw | dic | N | N | 0 |
| 1 | 1 | A | 61 | GRPXSEG | mpi_grpxseg | dic | N | N | 0 |
| 1 | 1 | A | 62 | USRHEAD | mpi_usrhead | dic | N | N | 0 |
| 1 | 1 | A | 63 | USRXGRP | mpi_usrxgrp | dic | N | N | 0 |
| 1 | 1 | A | 64 | USRPROP | mpi_usrprop | dic | N | N | 0 |
| 1 | 1 | A | 101 | MEMHEAD | mpi_memhead | mem | N | N | 0 |
| 1 | 1 | A | 102 | MEMBKTD | mpi_membktd | mem | N | Y | 0 |
| 1 | 1 | A | 103 | MEMCMPD | mpi_memcmpd | mem | N | Y | 0 |
| 1 | 1 | A | 104 | MEMQRYD | mpi_memqryd | mem | N | Y | 0 |
| 1 | 1 | A | 111 | MEMIQUE | mpi_memique | mem | N | Y | 0 |
| 1 | 1 | A | 112 | MEMOQUE | mpi_memoque | mem | N | Y | 0 |
| 1 | 1 | A | 113 | MEMNOTE | mpi_memnote | mem | N | N | 0 |
| 1 | 1 | A | 114 | MEMXEIA | mpi_memxeia | mem | N | N | 0 |
| 1 | 1 | A | 115 | MEMXTSK | mpi_memxtsk | mem | N | N | 0 |
| 1 | 1 | A | 116 | MEMLINK | mpi_memlink | mem | N | N | 0 |

TABLE 4-continued mpi_seghead

| caudrecno | maudrecno | recstat | segrecno | segcode | segname | objcode | hasattr | engineonly | segverno |
|---|---|---|---|---|---|---|---|---|---|
| 1 | 1 | A | 117 | MEMRULE | mpi_memrule | mem | N | N | 0 |
| 1 | 1 | A | 121 | ENTIQUE | mpi_entique | mem | N | Y | 0 |
| 1 | 1 | A | 122 | ENTOQUE | mpi_entoque | mem | N | Y | 0 |
| 1 | 1 | A | 123 | ENTNOTE | mpi_entnote | mem | N | N | 0 |
| 1 | 1 | A | 124 | ENTXEIA | mpi_entxeia | mem | N | N | 0 |
| 1 | 1 | A | 125 | ENTXTSK | mpi_entxtsk | mem | N | N | 0 |
| 1 | 1 | A | 126 | ENTLINK | mpi_entlink | mem | N | N | 0 |
| 1 | 1 | A | 127 | ENTRULE | mpi_entrule | mem | N | N | 0 |
| 1 | 1 | A | 131 | MEMATTR | mpi_memattr | mem | Y | N | 0 |
| 1 | 1 | A | 132 | MEMENUM | mpi_memenum | mem | Y | N | 0 |
| 1 | 1 | A | 133 | MEMNAME | mpi_memname | mem | Y | N | 0 |
| 1 | 1 | A | 134 | MEMADDR | mpi_memaddr | mem | Y | N | 0 |
| 1 | 1 | A | 135 | MEMPHONE | mpi_memphon | mem | Y | N | 0 |
| 1 | 1 | A | 137 | MEMIDENT | mpi_memident | mem | Y | N | 0 |
| 1 | 1 | A | 138 | MEMDATE | mpi_memdate | mem | Y | N | 0 |
| 1 | 1 | A | 139 | MEMTEXT | mpi_memtext | mem | Y | N | 0 |
| 1 | 1 | A | 140 | MEMOREF | mpi_memoref | mem | Y | N | 0 |
| 1 | 1 | A | 141 | MEMAPPT | mpi_memappt | mem | Y | N | 0 |
| 1 | 1 | A | 142 | MEMELIG | mpi_memelig | mem | Y | N | 0 |
| 1 | 1 | A | 143 | MEMDRUG | mpi_memdrug | mem | Y | N | 0 |
| 1 | 1 | A | 144 | MEMCONT | mpi_memcont | mem | Y | N | 0 |
| 1 | 1 | A | 145 | MEMEXTA | mpi_memexta | mem | Y | N | 0 |
| 1 | 1 | A | 146 | MEMEXTB | mpi_memextb | mem | Y | N | 0 |
| 1 | 1 | A | 147 | MEMEXTC | mpi_memextc | mem | Y | N | 0 |
| 1 | 1 | A | 148 | MEMEXTD | mpi_memextd | mem | Y | N | 0 |
| 1 | 1 | A | 149 | MEMEXTE | mpi_memexte | mem | Y | N | 0 |
| 1 | 1 | A | 201 | AUDHEAD | mpi_audhead | aud | N | Y | 0 |
| 1 | 1 | A | 202 | AUDATTR | mpi_audattr | aud | N | Y | 0 |
| 1 | 1 | A | 203 | AUDXMEM | mpi_audxmem | aud | N | Y | 0 |

TABLE 5 mpi_segxfld

| caudrecno | maudrecno | recstat | segcode | fldseqno | fldname | fldlabel | fldtype | fldlength | ispkey | isrequired | isvirtual |
|---|---|---|---|---|---|---|---|---|---|---|---|
| 1 | 1 | A | MEMATTR | 1 | attrval | attrVal | CHAR | 128 | N | Y | N |
| 1 | 1 | A | MEMENUM | 1 | elemrecno | elemRecno | UDWORD | 0 | N | Y | N |
| 1 | 1 | A | MEMENUM | 2 | elemval | elemVal | CHAR | 40 | N | Y | Y |
| 1 | 1 | A | MEMNAME | 1 | onmlast | onmLast | CHAR | 75 | N | N | N |
| 1 | 1 | A | MEMNAME | 2 | onmfirst | onmFirst | CHAR | 30 | N | N | N |
| 1 | 1 | A | MEMNAME | 3 | onmmiddle | onmMiddle | CHAR | 30 | N | N | N |
| 1 | 1 | A | MEMNAME | 4 | onmprefix | onmPrefix | CHAR | 10 | N | N | N |
| 1 | 1 | A | MEMNAME | 5 | onmsuffix | onmSuffix | CHAR | 10 | N | N | N |
| 1 | 1 | A | MEMNAME | 6 | onmdegree | onmDegree | CHAR | 10 | N | N | N |
| 1 | 1 | A | MEMNAME | 7 | onmtitle | onmTitle | CHAR | 20 | N | N | N |
| 1 | 1 | A | MEMADDR | 1 | stline1 | stLine1 | CHAR | 75 | N | N | N |
| 1 | 1 | A | MEMADDR | 2 | stline2 | stLine2 | CHAR | 75 | N | N | N |
| 1 | 1 | A | MEMADDR | 3 | stline3 | stLine3 | CHAR | 75 | N | N | N |
| 1 | 1 | A | MEMADDR | 4 | stline4 | stLine4 | CHAR | 75 | N | N | N |
| 1 | 1 | A | MEMADDR | 5 | city | city | CHAR | 30 | N | N | N |
| 1 | 1 | A | MEMADDR | 6 | state | state | CHAR | 15 | N | N | N |
| 1 | 1 | A | MEMADDR | 7 | zipcode | zipCode | CHAR | 10 | N | N | N |
| 1 | 1 | A | MEMADDR | 8 | country | country | CHAR | 3 | N | N | N |
| 1 | 1 | A | MEMADDR | 9 | geotext1 | geoText1 | CHAR | 40 | N | N | N |
| 1 | 1 | A | MEMADDR | 10 | geocode1 | geoCode1 | CHAR | 8 | N | N | N |
| 1 | 1 | A | MEMADDR | 11 | geocode2 | geoCode2 | CHAR | 8 | N | N | N |
| 1 | 1 | A | MEMPHONE | 1 | phicc | phIcc | CHAR | 3 | N | N | N |
| 1 | 1 | A | MEMPHONE | 2 | pharea | phArea | CHAR | 5 | N | N | N |
| 1 | 1 | A | MEMPHONE | 3 | phnumber | phNumber | CHAR | 20 | N | Y | N |
| 1 | 1 | A | MEMPHONE | 4 | phextn | phExtn | CHAR | 6 | N | N | N |
| 1 | 1 | A | MEMPHONE | 5 | phcmnt | phCmnt | CHAR | 20 | N | N | N |
| 1 | 1 | A | MEMIDENT | 1 | idsrcrecno | idSrcRecno | UDWORD | 0 | N | Y | Y |
| 1 | 1 | A | MEMIDENT | 2 | idissuer | idIssuer | CHAR | 12 | N | Y | Y |
| 1 | 1 | A | MEMIDENT | 3 | idnumber | idNumber | CHAR | 40 | N | Y | N |
| 1 | 1 | A | MEMIDENT | 4 | idexpdate | idExpDate | DTTM | 0 | N | N | N |
| 1 | 1 | A | MEMDATE | 1 | dateval | dateVal | CHAR | 19 | N | Y | N |
| 1 | 1 | A | MEMTEXT | 1 | textval | textVal | CHAR | 32767 | N | Y | N |
| 1 | 1 | A | MEMOREF | 1 | objrecno | objRecno | UDWORD | 0 | N | Y | N |
| 1 | 1 | A | MEMAPPT | 1 | apsrcrecno | apSrcRecno | UDWORD | 0 | N | Y | N |
| 1 | 1 | A | MEMAPPT | 2 | apissuer | apIssuer | CHAR | 12 | N | Y | Y |
| 1 | 1 | A | MEMAPPT | 3 | apnumber | apNumber | CHAR | 40 | N | Y | N |

TABLE 5-continued mpi_segxfld

| caudrecno | maudrecno | recstat | segcode | fldseqno | fldname | fldlabel | fldtype | fldlength | ispkey | isrequired | isvirtual |
|---|---|---|---|---|---|---|---|---|---|---|---|
| 1 | 1 | A | MEMAPPT | 4 | apstime | apStime | DTTM | 0 | N | Y | N |
| 1 | 1 | A | MEMAPPT | 5 | resid | resId | CHAR | 20 | N | N | N |
| 1 | 1 | A | MEMAPPT | 6 | resloc | resLoc | CHAR | 20 | N | N | N |
| 1 | 1 | A | MEMAPPT | 7 | resdept | resDept | CHAR | 20 | N | N | N |
| 1 | 1 | A | MEMELIG | 1 | onmlast | onmLast | CHAR | 75 | N | N | N |
| 1 | 1 | A | MEMELIG | 2 | onmfirst | onmFirst | CHAR | 30 | N | N | N |
| 1 | 1 | A | MEMELIG | 3 | onmmiddle | onmMiddle | CHAR | 30 | N | N | N |
| 1 | 1 | A | MEMELIG | 4 | onmprefix | onmPrefix | CHAR | 10 | N | N | N |
| 1 | 1 | A | MEMELIG | 5 | onmsuffix | onmSuffix | CHAR | 10 | N | N | N |
| 1 | 1 | A | MEMELIG | 6 | onmdegree | onmDegree | CHAR | 10 | N | N | N |
| 1 | 1 | A | MEMELIG | 7 | stline1 | stLine1 | CHAR | 75 | N | N | N |
| 1 | 1 | A | MEMELIG | 8 | stline2 | stLine2 | CHAR | 75 | N | N | N |
| 1 | 1 | A | MEMELIG | 9 | city | city | CHAR | 30 | N | N | N |
| 1 | 1 | A | MEMELIG | 10 | state | state | CHAR | 15 | N | N | N |
| 1 | 1 | A | MEMELIG | 11 | zipcode | zipCode | CHAR | 15 | N | N | N |
| 1 | 1 | A | MEMELIG | 12 | country | country | CHAR | 3 | N | N | N |
| 1 | 1 | A | MEMELIG | 13 | geotext1 | geoText1 | CHAR | 40 | N | N | N |
| 1 | 1 | A | MEMELIG | 14 | geocode1 | geoCode1 | CHAR | 8 | N | N | N |
| 1 | 1 | A | MEMELIG | 15 | geocode2 | geoCode2 | CHAR | 8 | N | N | N |
| 1 | 1 | A | MEMELIG | 16 | phicc | phIcc | CHAR | 3 | N | N | N |
| 1 | 1 | A | MEMELIG | 17 | pharea | phArea | CHAR | 5 | N | N | N |
| 1 | 1 | A | MEMELIG | 18 | phnumber | phNumber | CHAR | 13 | N | N | N |
| 1 | 1 | A | MEMELIG | 19 | phextn | phExtn | CHAR | 6 | N | N | N |
| 1 | 1 | A | MEMELIG | 20 | phcmnt | phCmnt | CHAR | 20 | N | N | N |
| 1 | 1 | A | MEMELIG | 21 | dob | dob | DTTM | 0 | N | N | N |
| 1 | 1 | A | MEMELIG | 22 | ssn | ssn | CHAR | 9 | N | N | N |
| 1 | 1 | A | MEMELIG | 23 | sex | sex | CHAR | 1 | N | N | N |
| 1 | 1 | A | MEMELIG | 24 | percode | perCode | CHAR | 3 | N | N | N |
| 1 | 1 | A | MEMELIG | 25 | insgroup | insGroup | CHAR | 20 | N | N | N |
| 1 | 1 | A | MEMELIG | 26 | insplan | insPlan | CHAR | 20 | N | N | N |
| 1 | 1 | A | MEMELIG | 27 | eligdate | eligDate | DTTM | 0 | N | N | N |
| 1 | 1 | A | MEMELIG | 28 | termdate | termDate | DTTM | 0 | N | N | N |
| 1 | 1 | A | MEMDRUG | 1 | onmlast | onmLast | CHAR | 75 | N | N | N |
| 1 | 1 | A | MEMDRUG | 2 | onmfirst | onmFirst | CHAR | 30 | N | N | N |
| 1 | 1 | A | MEMDRUG | 3 | onmmiddle | onmMiddle | CHAR | 30 | N | N | N |
| 1 | 1 | A | MEMDRUG | 4 | dob | dob | DTTM | 0 | N | N | N |
| 1 | 1 | A | MEMDRUG | 5 | ssn | ssn | CHAR | 9 | N | N | N |
| 1 | 1 | A | MEMDRUG | 6 | sex | sex | CHAR | 1 | N | N | N |
| 1 | 1 | A | MEMDRUG | 7 | percode | perCode | CHAR | 3 | N | N | N |
| 1 | 1 | A | MEMDRUG | 8 | rxnumber | rxNumber | CHAR | 7 | N | N | N |
| 1 | 1 | A | MEMDRUG | 9 | refillnumber | refillNumber | UWORD | 0 | N | N | N |
| 1 | 1 | A | MEMDRUG | 10 | totalrefills | totalRefills | UWORD | 0 | N | N | N |
| 1 | 1 | A | MEMDRUG | 11 | pharmacyid | pharmacyId | CHAR | 17 | N | N | N |
| 1 | 1 | A | MEMDRUG | 12 | datefilled | dateFilled | DTTM | 0 | N | N | N |
| 1 | 1 | A | MEMDRUG | 13 | drugcode | drugCode | CHAR | 21 | N | N | N |
| 1 | 1 | A | MEMDRUG | 14 | quantity | quantity | UDWORD | 0 | N | N | N |
| 1 | 1 | A | MEMDRUG | 15 | dayssupply | daysSupply | UWORD | 0 | N | N | N |
| 1 | 1 | A | MEMDRUG | 16 | prescriberid | prescriberId | CHAR | 17 | N | N | N |
| 1 | 1 | A | MEMCONT | 1 | ctrname | ctrName | CHAR | 60 | N | N | N |
| 1 | 1 | A | MEMCONT | 2 | ctrid | ctrId | CHAR | 12 | N | N | N |
| 1 | 1 | A | MEMCONT | 3 | ctrmasname | ctrMasName | CHAR | 60 | N | N | N |
| 1 | 1 | A | MEMCONT | 4 | ctrmasid | ctrMasId | CHAR | 12 | N | N | N |
| 1 | 1 | A | MEMCONT | 5 | ctrlob | ctrLob | CHAR | 12 | N | N | N |
| 1 | 1 | A | MEMCONT | 6 | ctrcenter | ctrCenter | CHAR | 10 | N | N | N |
| 1 | 1 | A | MEMCONT | 7 | ctrnetwork | ctrNetwork | CHAR | 12 | N | N | N |
| 1 | 1 | A | MEMCONT | 8 | ctrdeal | ctrDeal | CHAR | 6 | N | N | N |
| 1 | 1 | A | MEMCONT | 9 | ctrcisid | ctrCisId | CHAR | 9 | N | N | N |
| 1 | 1 | A | MEMCONT | 10 | ctrseqnum | ctrSeqNum | CHAR | 3 | N | N | N |
| 1 | 1 | A | MEMCONT | 11 | ctrparcd | ctrParCd | CHAR | 9 | N | N | N |
| 1 | 1 | A | MEMCONT | 12 | ctrmarket | ctrMarket | CHAR | 12 | N | N | N |
| 1 | 1 | A | MEMCONT | 13 | ctreffdate | ctrEffDate | DTTM | 0 | N | N | N |
| 1 | 1 | A | MEMCONT | 14 | ctrenddate | ctrEndDate | DTTM | 0 | N | N | N |
| 1 | 1 | A | MEMEXTA | 1 | subidnum | subIdnum | CHAR | 60 | N | N | N |
| 1 | 1 | A | MEMEXTA | 2 | hpmemidnum | hpMemIdnum | CHAR | 30 | N | N | N |
| 1 | 1 | A | MEMEXTA | 3 | hpsubidnum | hpSubIdnum | CHAR | 30 | N | N | N |
| 1 | 1 | A | MEMEXTA | 4 | hppolidnum | hpPolIdnum | CHAR | 30 | N | N | N |
| 1 | 1 | A | MEMEXTA | 5 | memexpdate | memExpDate | DTTM | 0 | N | N | N |
| 1 | 1 | A | MEMEXTA | 6 | empname | empName | CHAR | 35 | N | N | N |
| 1 | 1 | A | MEMEXTA | 7 | onmlast | onmLast | CHAR | 75 | N | N | N |
| 1 | 1 | A | MEMEXTA | 8 | onmfirst | onmFirst | CHAR | 30 | N | N | N |
| 1 | 1 | A | MEMEXTA | 9 | onmmiddle | onmMiddle | CHAR | 30 | N | N | N |
| 1 | 1 | A | MEMEXTA | 10 | onmprefix | onmPrefix | CHAR | 10 | N | N | N |
| 1 | 1 | A | MEMEXTA | 11 | onmsuffix | onmSuffix | CHAR | 10 | N | N | N |
| 1 | 1 | A | MEMEXTA | 12 | dob | dob | DTTM | 0 | N | N | N |
| 1 | 1 | A | MEMEXTA | 13 | sex | sex | CHAR | 1 | N | N | N |

TABLE 5-continued mpi_segxfld

| caudrecno | maudrecno | recstat | segcode | fldseqno | fldname | fldlabel | fldtype | fldlength | ispkey | isrequired | isvirtual |
|---|---|---|---|---|---|---|---|---|---|---|---|
| 1 | 1 | A | MEMEXTA | 14 | ssn | ssn | CHAR | 9 | N | N | N |
| 1 | 1 | A | MEMEXTA | 15 | stline1 | stLine1 | CHAR | 60 | N | N | N |
| 1 | 1 | A | MEMEXTA | 16 | stline2 | stLine2 | CHAR | 60 | N | N | N |
| 1 | 1 | A | MEMEXTA | 17 | city | city | CHAR | 30 | N | N | N |
| 1 | 1 | A | MEMEXTA | 18 | state | state | CHAR | 2 | N | N | N |
| 1 | 1 | A | MEMEXTA | 19 | zipcode | zipCode | CHAR | 15 | N | N | N |
| 1 | 1 | A | MEMEXTA | 20 | country | country | CHAR | 3 | N | N | N |
| 1 | 1 | A | MEMEXTA | 21 | comtype1 | comType1 | CHAR | 2 | N | N | N |
| 1 | 1 | A | MEMEXTA | 22 | comdata1 | comData1 | CHAR | 80 | N | N | N |
| 1 | 1 | A | MEMEXTA | 23 | comtype2 | comType2 | CHAR | 2 | N | N | N |
| 1 | 1 | A | MEMEXTA | 24 | comdata2 | comData2 | CHAR | 80 | N | N | N |
| 1 | 1 | A | MEMEXTA | 25 | comtype3 | comType3 | CHAR | 2 | N | N | N |
| 1 | 1 | A | MEMEXTA | 26 | comdata3 | comData3 | CHAR | 80 | N | N | N |
| 1 | 1 | A | MEMEXTB | 1 | txnid | txnID | UDWORD | 0 | N | Y | N |
| 1 | 1 | A | MEMEXTB | 2 | propcode | propCode | CHAR | 8 | N | Y | N |
| 1 | 1 | A | MEMEXTB | 3 | doa | doa | DTTM | 0 | N | Y | N |
| 1 | 1 | A | MEMEXTB | 4 | cctype | ccType | CHAR | 2 | N | Y | N |
| 1 | 1 | A | MEMEXTB | 5 | ccexpdate | ccExpDate | CHAR | 8 | N | Y | N |
| 1 | 1 | A | MEMEXTB | 6 | ccnumber | ccNumber | CHAR | 40 | N | Y | N |
| 1 | 1 | A | MEMEXTC | 1 | acctnumber | acctNumber | CHAR | 20 | N | N | N |
| 1 | 1 | A | MEMEXTC | 2 | encdate | encDate | DTTM | 0 | N | N | N |
| 1 | 1 | A | MEMEXTC | 3 | disdate | disDate | DTTM | 0 | N | N | N |
| 1 | 1 | A | MEMEXTC | 4 | pattype | patType | CHAR | 20 | N | N | N |
| 1 | 1 | A | MEMEXTC | 5 | svctype | svcType | CHAR | 20 | N | N | N |
| 1 | 1 | A | MEMEXTC | 6 | svcloc | svcLoc | CHAR | 20 | N | N | N |
| 1 | 1 | A | MEMEXTC | 7 | phys1 | phys1 | CHAR | 20 | N | N | N |
| 1 | 1 | A | MEMEXTC | 8 | phys2 | phys2 | CHAR | 20 | N | N | N |
| 1 | 1 | A | MEMEXTC | 9 | plan1 | plan1 | CHAR | 20 | N | N | N |
| 1 | 1 | A | MEMEXTC | 10 | plan2 | plan2 | CHAR | 20 | N | N | N |
| 1 | 1 | A | MEMEXTC | 11 | user1 | user1 | CHAR | 20 | N | N | N |
| 1 | 1 | A | MEMEXTC | 12 | user2 | user2 | CHAR | 20 | N | N | N |
| 1 | 1 | A | MEMEXTD | 1 | secidnum | secIdnum | CHAR | 18 | N | N | N |
| 1 | 1 | A | MEMEXTD | 2 | onmlast | onmLast | CHAR | 18 | N | N | N |
| 1 | 1 | A | MEMEXTD | 3 | onmfirst | onmFirst | CHAR | 18 | N | N | N |
| 1 | 1 | A | MEMEXTD | 4 | onmmiddle | onmMiddle | CHAR | 18 | N | N | N |
| 1 | 1 | A | MEMEXTD | 5 | onmsuffix | onmSuffix | CHAR | 4 | N | N | N |
| 1 | 1 | A | MEMEXTD | 6 | ssn | ssn | CHAR | 11 | N | N | N |
| 1 | 1 | A | MEMEXTD | 7 | sex | sex | CHAR | 1 | N | N | N |
| 1 | 1 | A | MEMEXTD | 8 | dob | dob | DTTM | 0 | N | N | N |
| 1 | 1 | A | MEMEXTD | 9 | stline1 | stLine1 | CHAR | 30 | N | N | N |
| 1 | 1 | A | MEMEXTD | 10 | stline2 | stLine2 | CHAR | 30 | N | N | N |
| 1 | 1 | A | MEMEXTD | 11 | city | city | CHAR | 17 | N | N | N |
| 1 | 1 | A | MEMEXTD | 12 | state | state | CHAR | 2 | N | N | N |
| 1 | 1 | A | MEMEXTD | 13 | zipcode | zipCode | CHAR | 10 | N | N | N |
| 1 | 1 | A | MEMEXTD | 14 | phone | phone | CHAR | 12 | N | N | N |
| 1 | 1 | A | MEMEXTD | 15 | expind | expInd | CHAR | 1 | N | N | N |
| 1 | 1 | A | MEMEXTD | 16 | expdate | expDate | DTTM | 0 | N | N | N |
| 1 | 1 | A | MEMEXTD | 17 | moddate | modDate | DTTM | 0 | N | N | N |
| 1 | 1 | A | MEMEXTE | 1 | accnum | accNum | CHAR | 20 | N | Y | N |
| 1 | 1 | A | MEMEXTE | 2 | studate | stuDate | DTTM | 0 | N | N | N |
| 1 | 1 | A | MEMEXTE | 3 | studyId | studyId | CHAR | 64 | N | N | N |
| 1 | 1 | A | MEMEXTE | 4 | refphys | refPhys | CHAR | 40 | N | N | N |
| 1 | 1 | A | MEMEXTE | 5 | studesc | stuDesc | CHAR | 64 | N | N | N |
| 1 | 1 | A | MEMEXTE | 6 | stumod | stuMod | CHAR | 60 | N | N | N |
| 1 | 1 | A | MEMEXTE | 7 | frmcnt | frmCnt | UDWORD | 0 | N | N | N |
| 1 | 1 | A | MEMEXTE | 8 | pacsid | pacsId | CHAR | 180 | N | N | N |

TABLE 6

| caudrecno | maudrecno | recstat | attrrecno | memtypeno | segcode | attrcode | attrname | attrlabel | attrdesc | edtcode | isvirtual | adtrole | nsactive | nsexists | msfilter |
|---|---|---|---|---|---|---|---|---|---|---|---|---|---|---|---|
| 1 | 1 | A | 11 | 1 | MEMATTR | SEX | Sex | Sex | Sex | SEX | N | 0 | 1 | 0 | A |
| 1 | 1 | A | 12 | 1 | MEMATTR | RACE | Race | Race | Race | RACE | N | 0 | 1 | 0 | A |
| 1 | 1 | A | 13 | 1 | MEMATTR | MARSTAT | Marital Status | Marital Status | Marital Status | NULL | N | 0 | 1 | 0 | A |
| 1 | 1 | A | 14 | 1 | MEMATTR | RELIGION | Religion | Religion | Religion | NULL | N | 0 | 1 | 0 | A |
| 1 | 1 | A | 15 | 1 | MEMATTR | LANGUAGE | Language | Language | Language | NULL | N | 0 | 1 | 0 | A |
| 1 | 1 | A | 16 | 1 | MEMATTR | FACILIY | Facility | Facility | Facility | NULL | N | 0 | 1 | 0 | A |
| 1 | 1 | A | 17 | 1 | MEMATTR | OPERID | Registrar | Registrar | Registrar | NULL | N | 0 | 1 | 0 | A |
| 1 | 1 | A | 18 | 1 | MEMATTR | LOCATN | Location | Location | Location | NULL | N | 0 | 1 | 0 | A |
| 1 | 1 | A | 19 | 1 | MEMNAME | LGLNAME | Legal Name | Legal Name | Legal Name | NULL | N | 0 | 1 | 0 | A |
| 1 | 1 | A | 20 | 1 | MEMADDR | HOMEADDR | Home Address | Home Address | Home Address | NULL | N | 0 | 1 | 0 | A |
| 1 | 1 | A | 21 | 1 | MEMPHONE | HOMEPHON | Home Telephone | Home Telephone | Home Telephone | NULL | N | 0 | 1 | 0 | A |
| 1 | 1 | A | 22 | 1 | MEMPHONE | WORKPHON | Work Telephone | Work Telephone | Work Telephone | NULL | N | 0 | 0 | 0 | A |
| 1 | 1 | A | 23 | 1 | MEMIDENT | SSN | Social Security | Social Security | Social Security | NULL | N | 0 | 1 | 0 | A |
| 1 | 1 | A | 24 | 1 | MEMIDENT | PTENTRID | Enterprise ID | Enterprise ID | Enterprise ID | NULL | N | 0 | 1 | 0 | A |
| 1 | 1 | A | 25 | 1 | MEMIDENT | PTCHRTID | Chart ID | Chart ID | Chart ID | NULL | N | 0 | 0 | 0 | A |
| 1 | 1 | A | 26 | 1 | MEMIDENT | MRN | Medical Record Number | Medical Record Number | Medical Record Number | NULL | N | 0 | 0 | 0 | A |
| 1 | 1 | A | 27 | 1 | MEMDATE | BIRTHDT | Birth Date | Birth Date | Birth Date | NULL | N | 0 | 1 | 0 | A |
| 1 | 1 | A | 28 | 1 | MEMDATE | DEATHDT | Death Date | Death Date | Death Date | NULL | N | 0 | 0 | 0 | A |
| 1 | 1 | A | 29 | 1 | MEMNAME | PCPNAME | Primary Care Provider | Primary Care Provider | Primary Care Provider | NULL | N | 0 | 1 | 0 | A |
| 1 | 1 | A | 30 | 1 | MEMATTR | PCPLICID | Primary Care Provider License Id | Primary Care Provider License Id | Primary Care Provider License Id | NULL | N | 0 | 1 | 0 | A |
| 1 | 1 | A | 31 | 1 | MEMATTR | PCPPRAC | Primary Care Provider Practice Name | Primary Care Provider Practice Name | Primary Care Provider Practice Name | NULL | N | 0 | 1 | 0 | A |
| 1 | 1 | A | 32 | 1 | MEMPHONE | PCPPHN | Primary Care Provider Phone | Primary Care Provider Phone | Primary Care Provider Phone | NULL | N | 0 | 1 | 0 | A |

TABLE 6-continued mpi_segattr

| caudrecno | maudrecno | recstat | attrrecno | memtypeno | segcode | attrcode | attrname | attrlabel | attrdesc | edtcode | isvirtual | adtrole | nsactive | nsexists | msfilter |
|---|---|---|---|---|---|---|---|---|---|---|---|---|---|---|---|
| 1 | 1 | A | 33 | 1 | MEMATTR | PCPDEAID | Primary Care Provider DEA Id | Primary Care Provider DEA Id | Primary Care Provider DEA Id | NULL | N | 0 | 1 | 0 | A |
| 1 | 1 | A | 34 | 1 | MEMATTR | PCPSPEC | Primary Care Provider Specialty | Primary Care Provider Specialty | Primary Care Provider Specialty | NULL | N | 0 | 1 | 0 | A |
| 1 | 1 | A | 41 | 1 | MEMATTR | ENCACCT | Encounter Acct Number | Encounter Acct Number | Encounter Acct Number | NULL | N | 0 | 0 | 0 | A |
| 1 | 1 | A | 42 | 1 | MEMDATE | ENCADM | Encounter Start Date | Encounter Start Date | Encounter Start Date | NULL | N | 0 | 0 | 0 | A |
| 1 | 1 | A | 43 | 1 | MEMDATE | ENCDIS | Encounter End Date | Encounter End Date | Encounter End Date | NULL | N | 0 | 0 | 0 | A |
| 1 | 1 | A | 44 | 1 | MEMATTR | ENCPAID | Encounter Paid | Encounter Paid | Encounter Paid | NULL | N | 0 | 0 | 0 | A |
| 1 | 1 | A | 45 | 1 | MEMATTR | ENCPTYPE | Encounter Patient Type | Encounter Patient Type | Encounter Patient Type | NULL | N | 0 | 0 | 0 | A |
| 1 | 1 | A | 46 | 1 | MEMATTR | ENCDIAG | Encounter Diagnosis | Encounter Diagnosis | Encounter Diagnosis | NULL | N | 0 | 0 | 0 | A |
| 1 | 1 | A | 51 | 1 | MEMNAME | GTNAME | Guarantor Name | Guarantor Name | Guarantor Name | NULL | N | 0 | 0 | 0 | A |
| 1 | 1 | A | 52 | 1 | MEMDATE | GTDOB | Guarantor Birthdate | Guarantor Birthdate | Guarantor Birthdate | NULL | N | 0 | 0 | 0 | A |
| 1 | 1 | A | 53 | 1 | MEMADDR | GTHADDR | Guarantor Home Address | Guarantor Home Address | Guarantor Home Address | NULL | N | 0 | 0 | 0 | A |
| 1 | 1 | A | 54 | 1 | MEMATTR | GTINSNM | Guarantor Ins Name | Guarantor Ins Name | Guarantor Ins Name | NULL | N | 0 | 0 | 0 | A |
| 1 | 1 | A | 55 | 1 | MEMATTR | GTINSPOL | Guarantor Ins Policy Number | Guarantor Ins Policy Number | Guarantor Ins Policy Number | NULL | N | 0 | 0 | 0 | A |
| 1 | 1 | A | 56 | 1 | MEMATTR | GTINSCOV | Guarantor Ins Coverage | Guarantor Ins Coverage | Guarantor Ins Coverage | NULL | N | 0 | 0 | 0 | A |
| 1 | 1 | A | 57 | 1 | MEMATTR | GTEMPNM | Guarantor Employer Name | Guarantor Employer Name | Guarantor Employer Name | NULL | N | 0 | 0 | 0 | A |
| 1 | 1 | A | 58 | 1 | MEMATTR | GTOCC | Guarantor Occupation | Guarantor Occupation | Guarantor Occupation | NULL | N | 0 | 0 | 0 | A |
| 1 | 1 | A | 59 | 1 | MEMIDENT | GTSSN | Guarantor SSN | Guarantor SSN | Guarantor SSN | NULL | N | 0 | 0 | 0 | A |
| 1 | 1 | A | 60 | 1 | MEMAPPT | APPT | APPT | APPT | APPT | NULL | N | 0 | 0 | 0 | A |
| 1 | 1 | A | 61 | 1 | MEMEXTC | ENCNTR | Encounter Information | Encounter Information | Encounter Information | NULL | N | 0 | 0 | 0 | A |

Part of the IDS metadata defines how the data should be stored and persisted in a database. The mpi_seghead table gives the table name, and the segXfld table identifies the field name, the field data type, and field length (if needed). The tables defined above include flags which allow a user to define a segment that contains virtual fields, or virtual attributes. At a field level, the mpi_segxfld.isvirtual flag defines whether or not a data field should be stored. If it is marked as virtual, the Identity Hub engine will create space to store values, and will transport the values to and from any calling client application, but it will not save those values in the database. At an attribute level, the mpi_segattr.isvirtual flag says that the Identity Hub should not store the entire attribute. The IDS meta-data stores a generic data type that is not specific to any given relational database that the Identity Hub has been ported to. A mechanism in the Identity Hub engine translates from this generic data type to a RDBMS specific type through the use of a lookup file that is contained outside the database. A sample section of this file for the Oracle database is given below:

```
                    [ORACLE]
    integer =       number(10)
    smallint =      number(5)
    date =          date
    time =          date
    datetime =      date
    varchar =       varchar2(%s)
    char =          char(%s)
    bigtext =       long
    truncate =      truncate table %s
    optimize =      analyze table %s delete statistics
    optimize2 =     analyze table %s compute statistics for all indexes
    loader =        sqlldr
    tablist =       select table_name from user_tables
    idxlist =       select index_name from user_indexes
```

The IDS sub-system looks up the generic data type on the left from the mpi_segxfld table, and it is translated to the RDBMS specific type on the right. The reason this file is not stored in the database is that Engine 320 needs the RDBMS specific types prior to creating the segment metadata tables when the system is first installed. Hub 300 has utility programs that can create a database from the generic data types for any RDBMS that Hub 300 has been ported to. When defining a new segment, Manager 330 will export the generic DDL statement used to make the database specific table and indexes. An example is show below for a fictional customer segment that contains a customer name, phone number, a customer id number, and date that shows when the customer first started doing business:

```
-- ------------------------------------------------
-- Generated via Initiate Identity Hub Manager
--
T|MEM|mpi_memcust|IDS Generated Table|
C|MEM|mpi_memcust|memrecno|integer|0|N|member record number|
C|MEM|mpi_memcust|memseqno|smallint|0|N|member record sequence number|
C|MEM|mpi_memcust|caudrecno|integer|0|N|create audit record number|
C|MEM|mpi_memcust|maudrecno|integer|0|N|modify audit record number|
C|MEM|mpi_memcust|recstat|char|1|N|record status: active, inactive, deleted|
C|MEM|mpi_memcust|attrrecno|smallint|0|N|attribute record number|
C|MEM|mpi_memcust|asaidxno|smallint|0|N|attribute sparse array index number|
```

-continued

```
C|MEM|mpi_memcust|custname|varchar|40|Y|SEGXFLD generated|
C|MEM|mpi_memcust|custid|integer|0|N|SEGXFLD generated|
C|MEM|mpi_memcust|custphone|varchar|20|Y|SEGXFLD generated|
C|MEM|mpi_memcust|custsince|datetime|0|Y|SEGXFLD generated|
I|MEM|mpi_memcust|mpi_memcust|U|memrecno,memseqno||
```

The generated DDL statement above contains not only the fields defined by the user, but also the fields used to join this data table to the rest of the data model of Hub 300 and to provide for attribute-level auditing. The additional scaffolding is generated automatically and may change as future versions of Hub 300 may need to change the data model. As discussed above, these Data Definition Language (DDL) statements are sent to the file system instead of the database, so that they can be used to create the empty tables before the database is fully populated.

In some embodiments, every segment used by Hub 300 could be built by the IDS technology disclosed herein. In some embodiments, the scope of the IDS capability of Manager 330 is limited to a sub-section of the data model called Member Attributes. Member Attributes are data segments that contain the demographic data used for comparison by Hub 300. They are the most likely point in the data model for a customer to want to customize or add additional capability. However, as one skilled in the art can appreciate, the scope of the IDS capability may be extended to include all but a small kernel of segments that will need to remain pre-defined so that the system may bootstrap itself at startup.

Figure 9:
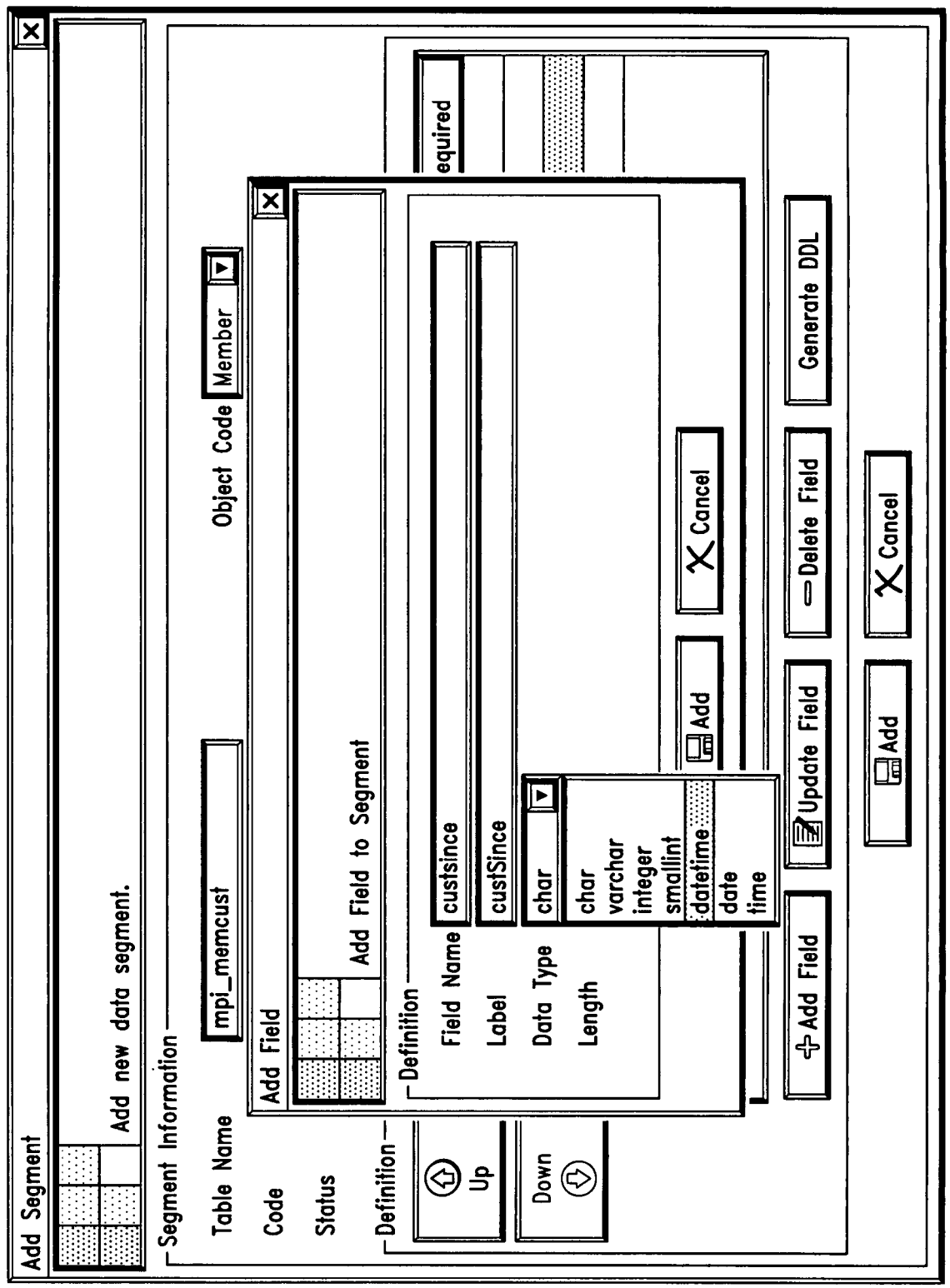
FIG. 9 shows a screenshot of one embodiment of an Add Field component of Identity Hub Manager of FIG. 4 through which field(s) can be added to a segment.

In some embodiments, Manager 330 is programmed to enable an implementer or an administrator to define Implementation Defined Segments and the attributes that use these segments. As an example, FIGS. 8-9 show screenshots of the dialogs where the MEMCUST example segment was defined. Specifically, FIG. 8 shows a screenshot of one embodiment of an Add Segment component of Manager 330. The first dialog as shown in FIG. 8 defines the MEMCUST example segment. The database independent DDL example shown above can be generated by selecting (clicking on) the Generate DDL button (icon). A field can be added, updated, or deleted by selecting an appropriate button or icon.

FIG. 9 shows a screenshot of one embodiment of an Add Field component of Manager 330. This next dialog shows how the fourth field "custsince" was added to the MEMCUST example segment. Specifically, the implementer would click on Add Field button 802 at the first dialog and be presented with the next dialog as shown in FIG. 9. In this example, the implementer would specify the Field Name, Label, Data Type, and Length, and then click the Add button to complete the process of adding the new field "custsince" to the segment "MEMCUST". The valid data types (e.g., char, varchar, integer, smallint, datetime, date, time) are shown in a drop-down combo box control.

The IDS subsystem described above provides a way to programmatically access the IDS metadata and determine what data segments are available, and what data fields they are made up of. Hub 300 includes a set of programming APIs (Application Programming Interfaces) as libraries that can be called from the C++ or Java programming language. These same APIs are used on pre-built applications so they can adapt to new data segments in the same manner that a custom built client application would. In some embodiments, the APIs have metadata classes that allow a programmer to find out at run-time how many segments are defined in the system, and for each of those segments, what fields and data types are they made up of. Additional classes allow the creation of an Implementation Defined Segment, and access to the data in each of the fields in either its native data type or as a generic string representation. When writing data to Hub 300, the programmer most often knows the shape of the attribute (what fields exist and their data type). In some cases, the incoming data may be in string format. and the API can convert it to the proper underlying data type for the caller. The dictionary store contains the metadata required to figure out what attribute is linked to a particular segment and the API will ensure that the proper amount of storage to hold that segment is allocated. By interrogating the metadata tables, knowledge of the shape of a particular segment can be obtained, as well as the number of segments defined (e.g., for an embodiment of Engine 320).

FIG. 10 depicts a schematic representation of one embodiment of an exemplary method of accessing data segments in computer network 100 where client 12 and server 16 reside. There are various ways to access a segment and its field(s), including direct access and indirect access through client interactions. Within this disclosure, an interaction refers to a request from client 12 to Hub 300 (e.g., residing on server 16) and the result of that request from Hub 300 back to client 12. Via TCP/IP connects and through Initiate™ APIs, user actions are associated with specific interactions. Segments are the logical representation of a table of its contents within Database 340.

When a user initiates an action (e.g., a retrieve), a specific interaction (e.g., MEMGET) sends the retrieve criteria to Hub 300. The returned data includes segments (e.g., MEMHEAD, MEMATTR, MEMNAME, MEMADDR, MEMPHONE, MEMTYPE, and/or MEMIDENT) containing the requested member data from the applicable tables (e.g., mpi_memhead, mpi_memattr, mpi_memname, mpi_memaddr, mpi_memphone, mpi_memtype, and/or mpi_memident). Depending upon the interaction, the specific criteria, and the information stored in Database 340 about a member, multiple segments may be returned. This process is illustrated in FIG. 10.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope of the invention as detailed in the following claims.

What is claimed is:

1. A system, comprising:
a processor;
one or more computer readable media accessible by said processor and storing computer instructions executable by said processor; and
an identity hub installed on said one or more computer readable media and comprising an identity engine to match and integrate data relating to identities from a plurality of different information sources into an identity hub data schema corresponding to a schema of a database, wherein said identity hub data schema includes one or more pre-defined segments for storing corresponding data from the different information sources with each pre-defined segment encapsulating a corresponding database object element from the database;
wherein said identity hub further comprises a set of metadata tables defining one or more custom segments for altering the identity hub data schema and corresponding database schema for a particular user implementation, wherein the custom segments are used for storing corresponding data from the different information sources and each custom segment encapsulates a corresponding database object element from the database, wherein said custom segments are defined by a user via a user interface to store data from the different information sources specific to the particular user implementation, and wherein said specific data stored by said custom segments includes data from the different information sources other than said corresponding data stored by said pre-defined segments;
wherein said set of metadata tables includes information to define the one or more custom segments including for each custom segment a unique name, individual fields, one or more roles, and an indication of persisting custom segment data in the database.

2. The system of claim 1, wherein said set of metadata tables is deployable to a client computer and read at system start-up of said client computer.

3. The system of claim 1, wherein one or more custom segments are added to said identity hub by utilizing said set of metadata tables to describe said one or more custom segments.

4. The system of claim 1, wherein each custom segment is a data structure which encapsulates a single row.

5. The system of claim 1, wherein each custom segment has one or more editable fields and an associated Data Definition Language (DDL) statement.

6. The system of claim 5, wherein said associated DDL statement is stored to a file system.

7. The system of claim 1, wherein one or more fields of each custom segment are specified.

8. The system of claim 7, wherein a field of a custom segment is configured to be added, updated, or deleted.

9. A computer readable medium embodying a set of metadata tables defining one or more custom segments to be used for storing data in an identity hub residing on a server computer, wherein said identity hub comprises an identity engine to match and integrate data relating to identities from a plurality of different information sources into an identity hub data schema corresponding to a schema of a database, wherein said identity hub data schema includes one or more pre-defined segments for storing corresponding data from the different information sources with each pre-defined segment encapsulating a corresponding database object element from the database, wherein the custom segments alter the identity hub data schema and corresponding database schema for a particular user implementation and each custom segment encapsulates a corresponding database object element from the database, wherein said custom segments are defined by a user for the identity hub data schema via a user interface to store data from the different information sources specific to the particular user implementation, and wherein said specific data stored by said custom segments includes data from the different information sources other than said corresponding data stored by said pre-defined segments;
wherein said set of metadata tables includes a first metadata table, a second metadata table, and a third metadata table;
wherein each row of said first metadata table defines a unique name of a custom segment and an indication of persisting custom segment data in the database;
wherein said second metadata table defines individual fields contained in each custom segment defined in said first metadata table; and wherein said third metadata table defines one or more roles of a particular custom segment.

10. The computer readable medium of claim 9, wherein said set of metadata tables is deployable to a client computer and read at system start-up of said client computer.

11. The computer readable medium of claim 9, wherein one or more custom segments are added to said identity hub by utilizing said set of metadata tables to describe said one or more custom segments.

12. The computer readable medium of claim 9, wherein each custom segment is a data structure which encapsulates a single row.

13. The computer readable medium of claim 9, wherein each custom segment has one or more editable fields and an associated Data Definition Language (DDL) statement.

14. The computer readable medium of claim 13, wherein said associated DDL statement is stored to a file system.

15. The computer readable medium of claim 9, wherein one or more fields of each custom segment are specified.

16. The computer readable medium of claim 15, wherein a field of a custom segment is configured to be added, updated, or deleted.

17. A method of generating implementation defined segments, comprising:

reading, at system start-up of a client computer, a set of metadata tables defining one or more custom segments to be used for storing data in an identity hub residing on a server computer, wherein said identity hub comprises an identity engine to match and integrate data relating to identities from a plurality of different information sources into an identity hub data schema corresponding to a schema of a database, wherein said identity hub data schema includes one or more pre-defined segments for storing corresponding data from the different information sources with each pre-defined segment encapsulating a corresponding database object element from the database, wherein the custom segments alter the identity hub data schema and corresponding database schema for a particular user implementation and each custom segment encapsulates a corresponding database object element from the database, wherein said custom segments are defined by a user for the identity hub data schema via a user interface to store data from the different information sources specific to the particular user implementation, and wherein said specific data stored by said custom segments includes data from the different information sources other than said corresponding data stored by said pre-defined segments; and utilizing said set of metadata tables to describe one or more custom segments;

wherein said set of metadata tables includes a first metadata table, a second metadata table, and a third metadata table;

wherein each row of said first metadata table defines a unique name of a custom segment and an indication of persisting custom segment data in the database;

wherein said second metadata table defines individual fields contained in each custom segment defined in said first metadata table; and wherein said third metadata table defines one or more roles of a particular custom segment.

18. The method of claim 17, wherein each custom segment is a data structure which encapsulates a single row.

19. The method of claim 17, further comprising generating an associated Data Definition Language (DDL) statement for each custom segment.

20. The method of claim 19, further comprising storing said associated DDL statement to a file system.

21. The method of claim 17, further comprising specifying one or more fields for each custom segment.

22. The method of claim 21, further comprising adding, updating, or deleting a field.

23. The method of claim 17, wherein one or more custom segments are added to said identity hub by utilizing said set of metadata tables to describe said one or more custom segments.

24. The method of claim 17, wherein each custom segment has one or more editable fields.

* * * * *